US011763809B1

(12) United States Patent
Bobbili et al.

(10) Patent No.: US 11,763,809 B1
(45) Date of Patent: Sep. 19, 2023

(54) ACCESS TO MULTIPLE VIRTUAL ASSISTANTS

(71) Applicant: Amazon Technologies, Inc., Seattle, WA (US)

(72) Inventors: Naveen Bobbili, Campbell, CA (US); David Henry, New York, NY (US); Mark Vincent Mattione, Shoreline, WA (US); Richard Du, Cupertino, CA (US); Jyoti Chhabra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 17/114,093

(22) Filed: Dec. 7, 2020

(51) Int. Cl.
G10L 15/22 (2006.01)
G10L 15/18 (2013.01)
G10L 15/32 (2013.01)
G10L 15/24 (2013.01)
G06F 3/01 (2006.01)
G10L 15/08 (2006.01)

(52) U.S. Cl.
CPC .............. *G10L 15/22* (2013.01); *G06F 3/017* (2013.01); *G10L 15/1815* (2013.01); *G10L 15/24* (2013.01); *G10L 15/32* (2013.01); *G10L 2015/088* (2013.01); *G10L 2015/223* (2013.01)

(58) Field of Classification Search
CPC ..... G10L 15/22; G10L 15/1815; G10L 15/24; G10L 15/32; G10L 2015/088; G10L 2015/223; G06F 3/017
USPC ........................................................ 704/257
See application file for complete search history.

(56) References Cited

U.S. PATENT DOCUMENTS 7,386,454 B2 * 6/2008 Gopinath ................ G10L 15/22
704/E15.04
7,668,990 B2 * 2/2010 Krzyzanowski ... H04N 21/4131
710/72

(Continued)

FOREIGN PATENT DOCUMENTS

WO 2016085776 A1 6/2016
WO 2018009897 A1 1/2018

OTHER PUBLICATIONS

International Search Report and Written Opinion dated Apr. 5, 2022 for International Patent Application No. PCT/US2021/061713.

*Primary Examiner* — Thuykhanh Le
(74) *Attorney, Agent, or Firm* — PIERCE ATWOOD LLP

(57) ABSTRACT

A speech-processing system may provide access to multiple virtual assistants via one or more voice-controlled devices. Each assistant may leverage language processing and language generation features of the speech-processing system, while handling different commands and/or providing access to different back applications. Each assistant may be associated with its own voice and/or speech style, and thus be perceived as having a particular "personality." In some situations, a user may invoke a first assistant, e.g., with a wakeword or button press, and provide a command that the speech-processing system may determine will be better handled by a second assistant. The speech-processing system may thus call on a component to generate plan data describing one or more operations for the speech-processing system to execute to handoff the command to the second assistant and provide the user with indications of which assistant will handle the command.

20 Claims, 18 Drawing Sheets

(56) References Cited

U.S. PATENT DOCUMENTS

| | | | | |
|---|---|---|---|---|
| 8,271,287 B1* | 9/2012 | Kermani | H04N 21/42222 | 704/275 |
| 8,306,810 B2* | 11/2012 | Li | G06F 40/30 | 704/251 |
| 8,584,221 B2* | 11/2013 | Mazur | H04L 63/0846 | 726/8 |
| 8,626,489 B2* | 1/2014 | Lee | G06F 40/20 | 704/7 |
| 8,725,513 B2* | 5/2014 | Cross, Jr. | G10L 15/22 | 715/728 |
| 8,918,411 B1* | 12/2014 | Latif | H04L 65/403 | 707/790 |
| 9,595,171 B2* | 3/2017 | Hurtig | G06F 3/0487 | |
| 9,926,138 B1* | 3/2018 | Brazeau | B25J 5/007 | |
| 9,984,686 B1* | 5/2018 | Mutagi | G10L 15/26 | |
| 10,257,577 B2* | 4/2019 | Arling | H04N 21/6332 | |
| 10,379,808 B1* | 8/2019 | Angel | G10L 15/22 | |
| 10,601,604 B2* | 3/2020 | Kozura | H04L 12/2832 | |
| 10,692,489 B1 | 6/2020 | Grizzel | | |
| 2003/0109270 A1* | 6/2003 | Shorty | H04W 40/02 | 455/445 |
| 2005/0159823 A1* | 7/2005 | Hayes | H04L 12/2803 | 700/19 |
| 2006/0271993 A1* | 11/2006 | Nakata | H04L 12/2829 | 725/135 |
| 2007/0185597 A1* | 8/2007 | Bejean | G08C 17/00 | 700/83 |
| 2008/0033724 A1* | 2/2008 | Block | G10L 15/22 | 704/E15.04 |
| 2010/0138224 A1* | 6/2010 | Bedingfield, Sr. | G10L 15/22 | 704/E15.001 |
| 2011/0157479 A1* | 6/2011 | Higuchi | H04N 5/44 | 348/734 |
| 2011/0257973 A1* | 10/2011 | Chutorash | G01C 21/3661 | 701/1 |
| 2013/0042026 A1* | 2/2013 | Shinomiya | H04L 12/282 | 710/5 |
| 2013/0073293 A1* | 3/2013 | Jang | G10L 15/22 | 704/E21.001 |
| 2013/0290911 A1* | 10/2013 | Praphul | G06F 3/038 | 715/863 |
| 2014/0059287 A1* | 2/2014 | Bains | G11C 7/02 | 711/106 |
| 2014/0095780 A1* | 4/2014 | Bains | G11C 7/1072 | 711/105 |
| 2014/0188461 A1* | 7/2014 | Myslinski | G06Q 10/10 | 704/9 |
| 2014/0330569 A1* | 11/2014 | Kolavennu | G10L 15/1815 | 704/275 |
| 2015/0087278 A1* | 3/2015 | Kim | H04L 63/062 | 455/414.1 |
| 2015/0088518 A1* | 3/2015 | Kim | G10L 17/22 | 704/251 |
| 2015/0154976 A1* | 6/2015 | Mutagi | G06F 3/167 | 704/275 |
| 2015/0170652 A1* | 6/2015 | Kaplan | G10L 15/22 | 704/246 |
| 2015/0332665 A1* | 11/2015 | Mishra | G10L 15/183 | 704/257 |
| 2015/0348551 A1* | 12/2015 | Gruber | G10L 15/1822 | 704/235 |
| 2015/0370531 A1* | 12/2015 | Faaborg | G10L 15/26 | 704/275 |
| 2016/0078870 A1* | 3/2016 | Helm | G10L 25/48 | 704/275 |
| 2016/0155443 A1* | 6/2016 | Khan | G06F 3/167 | 704/275 |
| 2016/0358460 A1* | 12/2016 | Lee | G08C 17/02 | |
| 2017/0365251 A1* | 12/2017 | Park | G10L 15/063 | |
| 2020/0114931 A1* | 4/2020 | Rao | G10L 15/26 | |
| 2020/0219491 A1* | 7/2020 | Jarosz | G10L 15/1822 | |
| 2020/0227034 A1* | 7/2020 | Summa | G10L 15/22 | |
| 2020/0302924 A1* | 9/2020 | Andreica | G10L 15/02 | |
| 2020/0302930 A1* | 9/2020 | Chen | H04L 12/2829 | |
| 2020/0380259 A1* | 12/2020 | Cahill | G06T 13/40 | |
| 2020/0382664 A1* | 12/2020 | Mori | H04N 1/00511 | |
| 2020/0413250 A1* | 12/2020 | Stuntebeck | H04W 12/63 | |
| 2021/0249018 A1* | 8/2021 | Shin | G10L 15/16 | |
| 2021/0335381 A1* | 10/2021 | Park | G10L 13/033 | |
| 2021/0349753 A1* | 11/2021 | Ou | G06F 9/4856 | |
| 2021/0366473 A1* | 11/2021 | Maeng | G06F 3/16 | |
| 2022/0084517 A1* | 3/2022 | Garg | B64D 47/00 | |

* cited by examiner

ACCESS TO MULTIPLE VIRTUAL ASSISTANTS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
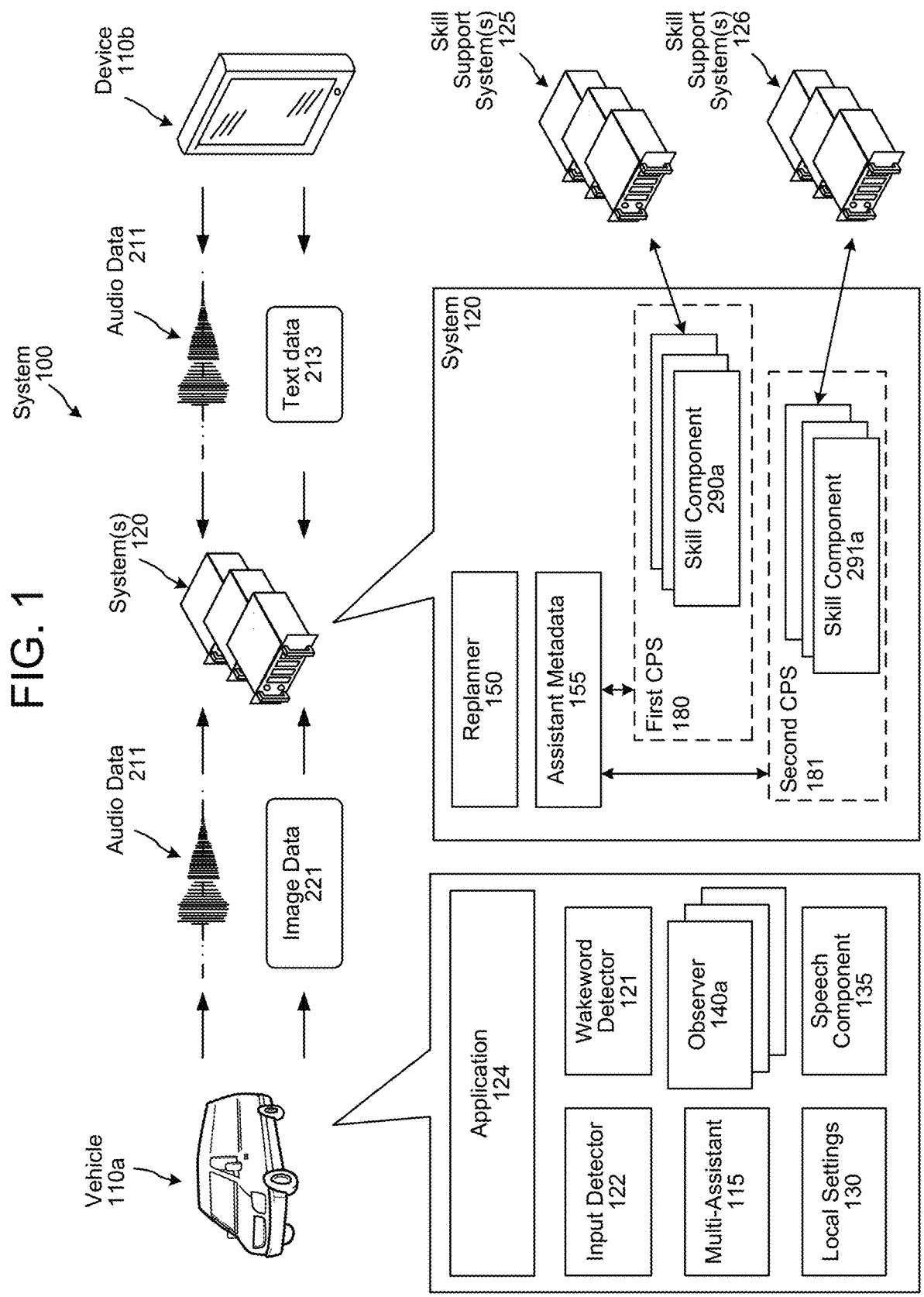
FIG. 1 is a conceptual diagram illustrating components of a device in a virtual assistant system for managing and coordinating a natural language dialog involving multiple command processing subsystems, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system. The assistant can leverage the speech-processing system as well as additional applications, skills, and/or speechlets to perform tasks for and/or on behalf of the user.

A voice-controlled user device and/or a remote system may be configured to receive a spoken user input and, using ASR, detect a wakeword and/or other text in the user input. The device and/or system may determine a command in the user input using NLU and provide a response to the command using TTS and/or other user interface. In some embodiments, the voice-controlled user device and/or the remote system may be configured to detect a gesture; that is, a non-verbal movement detectable by the device. The voice-controlled user device and/or the remote system may be configured to process a spoken user input received with and/or following the detected gesture. A user may thus control the voice-controlled user device, another user device, and/or the remote system by voice. In some embodiments, in response to the user device detecting the wakeword and/or gesture, the user device may send input data representing the user input to the remote system for further processing. The remote system may further process the input data to verify that it includes a representation of the wakeword and/or to determine the command. The user device may then receive, from the remote device, output audio, video, or other data related to a response to the command and/or other data required to perform an action associated with the response.

A user may be able to interact with more than one assistant using the speech-processing system. Each assistant may be embodied in a respective command processing subsystem (CPS) and described further herein. One assistant may be configured to offer a different user experience than another assistant. Each assistant may be associated with commands and/or responses to those commands unique to that assistant. For example, a first assistant may be preferred by a user for online shopping, while a second assistant may be preferred for navigation. A user may thus wish to direct online-shopping commands to the first assistant, and wish to direct navigation commands to the second assistant. A user may invoke a particular assistant with a wakeword and/or gesture (e.g., a non-verbal movement) associated with that assistant. For example, a first assistant may be invoked using the wakeword "Alexa" and a press-and-hold gesture, while a second assistant may be invoked using the wakeword "Hal" and a tap-to-talk gesture. Wakewords and/or gestures may be user-assignable. Each assistant may, in addition to being associated with its own, maybe unique, interpretation of commands, provide its own, maybe unique responses, and/or otherwise be perceived as having a particular "personality." This personality may include, for example, a particular albeit artificial speaking voice and/or style, such as "newscaster" or "celebrity." An assistant may respond with synthesized speech (generated by, for example, the TTS component) exhibiting aspects of the personality. A user may thus come to associate a certain assistant with a certain personality and thus recognize synthesized speech as being associated with a particular assistant by recognizing the personality.

Functions of an assistant may be provided by the speech-processing system via one or more CPSs. Each CPS may include settings and/or resources used by the speech-processing system to provide the functions of the corresponding assistant. In some embodiments, multiple CPSs may share certain resources of the speech-processing system; for example, the ASR component(s), NLU component(s), and/or TTS component(s). In other embodiments, however, each CPS may have its own dedicated ASR component(s), NLU component(s), and/or TTS component(s).

Each CPS may be associated with different back-end applications, speechlets, and/or skills. For example, a first CPS may be associated with a shopping skill and a second CPS may be associated with a vehicle navigation skill.

Each CPS may be associated with certain settings and/or other data maintained in a respective or shared assistant metadata component. The assistant metadata component may include information regarding functionality of CPSs, such as which CPSs are available with respect to a particular device and/or location, and which commands and/or skills are associated with a CPS. The assistant metadata component may include information regarding user experience (e.g., assistant "personalities"), such as which wakewords and/or gestures are associated with each CPS, light patterns and/or images that give a visual indication of the active CPS, TTS parameters and settings for giving a CPS a distinctive voice, etc. In some implementations, CPS-specific data such as intent and/or entity libraries, etc., may be provided to language processing components to streamline and/or augment language processing, and provide more accurate results.

In some situations, a user may invoke a first assistant for handling a command; for example, using a wakeword and/or a gesture associated with a first CPS. The speech-processing system may determine, however, that the command may be better handled by a second assistant associated with a second CPS. For example, the speech-processing system may determine a skill for executing the command, and further determine that the skill is associated with the second CPS but not the first CPS. The speech-processing system may thus perform a handoff from the first CPS to the second CPS. The speech-processing system may provide indications of the handoff for the purpose of informing the user of the transfer of responsibility from the first assistant to the second assistant. In doing so, the speech-processing system may perform operations corresponding to both the first CPS and the second CPS. This may present technical challenges related to providing outputs according to settings associated with distinct CPSs, the relative timing of the outputs, and routing of the command to the skill for execution.

The speech-processing system can therefore include a replanner component for orchestrating the various operations related to the handoff and command execution. The replanner component may generate plan data representing a sequence of operations for performing the handoff. The operations may include user experience operations such as providing verbal or non-verbal output via the device, and command processing operations such as calling a skill to execute with respect to the command. The replanner component may receive information indicating a requested CPS (e.g., representing the assistant invoked by the user), a skill, an intent, and a selected CPS for handling the skill/intent. The replanner component may use this data to generate plan data including operations for providing indications of the handoff and invoking the selected CPS for executing the command. For example, the plan data may include an operation to provide a verbal output based on the settings of the first CPS (that is, in the personality of the first assistant) announcing the handoff: "Hm, maybe Hal can help you with that." The plan data may include an operation to call a skill associated with the second CPS to execute the command. In some implementations, the replanner component may additionally select a handoff type. For example, rather than have the first CPS announce the handoff, the replanner may select a barge-in handoff type in which the selected CPS rather than the requested CPS announces the handoff: "Hal here. I can help you with that." In some implementations, the replanner may select the handoff type based on the identity of the requested CPS and/or the selected CPS. In some implementations, the replanner may select the handoff type based on the intent and/or skill. In some implementations, the replanner may select the handoff type based on user settings and/or a device type of the user device. Each handoff type may be associated with a template. The replanner component may use the template to generate plan data according to a selected handoff type. Rules for choosing a handoff type and templates for generating corresponding plan data may be provided by the assistant metadata component. These and other features of embodiments of the disclosure are detailed further below with reference to the accompanying figures.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating components of a device in a virtual assistant system 100 for managing and coordinating a natural language dialog involving multiple command processing subsystems (CPSs), according to embodiments of the present disclosure. The various components may be located on same or different physical devices. Communication between various components may occur directly or across a network(s) 199. The system 100 may include one or more voice-controlled devices 110 in communication with a natural language command processing system 120 (abbreviated "system 120"). The voice-controlled devices may include, for example, a vehicle 110a and/or a tablet computer 110b. Other devices 110 such as those illustrated in FIG. 17 and described below with reference to FIG. 15 may be used. As described in greater detail below, the device 110 may include a wakeword detector 121 for detecting one or more wakewords, an input detector 122 for detecting user input such as a gesture (e.g., a button press or touch-screen touch), and one or more applications 124 for receiving input, providing output, and/or changing a state of the device 110. The device 110 may include a microphone for receiving an audio signal. The wakeword detector 121 may determine that audio data corresponding to the audio contains a representation of a wakeword (as described in greater detail below); the device 110 may thereafter send the audio data to the system(s) 120. An example wakeword is "Alexa." The device 110 may instead or in addition send the audio data to the system(s) 120 when an input detector 122 detects an input—such as a key press, button press, touch-screen touch—corresponding to sending the audio data is detected. An example button is a "Push to Talk" button. The button and/or the input detector 122 may be capable of differentiating gestures such as tap-to-talk, push-and-hold, double-click, etc. In any event, the device 110 receives the audio 11, and sends corresponding input data to the server 120 as audio data 211, text data, a phonetic representation of the command, etc. As described in FIG. 3, however, additional language processing and command execution operations can be performed on the device 110, and the disclosure is not limited by whether the device 110 and/or system 120 performs operations described herein.

Once the wakeword is detected by the wakeword detector 121 and/or input is detected by the input detector 122, the device 110 may wake and begin transmitting audio data 211, representing the audio signal, to the system(s) 120; for example, via the speech component 135. The audio data 211 may include data corresponding to the wakeword; in other embodiments, the portion of the audio corresponding to the wakeword is removed by the device 110 prior to sending the audio data 211 to the system(s) 120. In the case of touch input detection, the audio data 211 may not include a wakeword. The device 110 may be equipped with a camera for capturing image data 221. The device 110 and/or the system 120 may process the image data 221 for purposes of gesture detection (e.g., when the gesture does not include touching a touch- or force-sensitive component), for user recognition, or for detecting context (e.g., is it day/night). The device 110 may also receive text input (or generate text data 213 based on an input) and transmit the text data 213 to the system 120.

The device 110 may include a multi-assistant component 115. The multi-assistant component 115 can receive and process requests to enable and/or disable CPS, such as the first CPS 180 and/or the second CPS 181 for handling commands received by the device 110. The multi-assistant component 115 can process changes in assistant settings, such as setting CPS-specific wakewords and/or gestures. The multi-assistant component 115 can distill the settings change request by seeing how the requested setting differs from the current settings state stored in the local settings component 130, update the local settings component 130 with the new settings, transmit the new settings to the system 120, and assign an observer component 140 to the CPS. The multi-assistant component 115 may retrieve eligible CPS information from system 120 to provide the user with a list of assistants that may be eligible for use with the speech-controlled device 110.

The device 110 may include a local settings component 130. The local settings component 130 can be a memory or storage that maintains settings related to the one or more CPSs eligible and/or enabled for the device 110. When the user requests a change to assistant settings, the multi-assistant component 115 can refer to the local settings component 130 to determine how the requested setting change differs from the current settings state stored in the local settings component 130. Following this process of distillation, the multi-assistant component 115 can transmit an indication of one or more assistant settings that have changed to the system 120. The system 120 may include a remote settings storage in, for example, the assistant metadata component 155.

The device 110 may include a speech component 135. The speech component 135 may receive input audio data from the application 124 and forward it to the system 120 for processing. In some implementations, the speech component 135 may include speech and/or language processing components such as those described with respect to the language processing component 392 described below with reference to FIG. 3. In some implementations, the speech component 135 may receive input audio data and send it to the system 120 in its original form; that is, as unprocessed audio data. In some implementations, the speech component 135 may process the audio data and transmit the resulting data in the form of ASR data such as phonemes or text, or NLU data in the form of an intent, entity identifiers, and/or slot data.

The device 110 may include one or more observer components 140a, 140b, and 140c, etc. (collectively "observer components 140"). The multi-assistant component 115 may assign an observer component 140 to each CPS enabled for the device 110. The observer component 140 can monitor the application 124, input detector 122, and/or wakeword detector 121 for invocations of the CPS for which it is assigned. The observer component 140 may notify the system 120 of assistant CPS invocation and provide the system 120 with audio data 211, image data 221, and/or text data 213 associated with the invocation.

The system 120 may include speech processing components including components for ASR, NLU, TTS, etc. as further detailed below with reference to FIG. 2. The system 120 additionally includes components configured to process commands received in a multi-assistant environment. In particular, the system 120 includes a replanner component 150, the assistant metadata component 155, a first CPS 180, and a second CPS 181. The first CPS may be associated with one or more skill components 290a, 290b, and 290c (collectively "skill components 290"), and the second CPS may be associated with one or more skill components 291a, 291b, and 291c (collectively "skill components 291"). The system 120 is not limited to two CPSs, and in some implementations may include many CPSs. In some embodiments, one or more skill components 290 or 291 may be shared between two or more CPSs. In some embodiments, the system 120 may include more or fewer skill components 290 or 291, including skill components for additional CPSs. The skill components 290 and/or 291 may communicate with one or more skill support systems 125 or 126, which may augment the resources of the skill components 290 or 291, respectively.

A CPS 180 and/or 181 may include software and/or logic configured to provide the functions of a virtual assistant to the user. The software and/or logic may exist in shared resources of the system 120 (e.g., memory and/or processors), or in distinct dedicated resources. The CPSs 180 and/or 181 may receive calls and/or other data from the orchestrator component 230 (described further below) and return responses to the orchestrator component 230. The CPSs 180 and/or 181 may also store and retrieve data to/from the assistant metadata component 155, such as settings specific to a CPSs 180 and/or 181 and/or to particular users of the CPSs 180 and/or 181. Data provided by the assistant metadata component 155 may be used by the CPSs 180 and/or 181 to project a "personality" in the form of an identifiable voice and/or visual themes. The CPSs 180 and/or 181 may each operate in conjunction with the skill components 290 and/or 291, respectively. In some operations, for example, a user may invoke the first CPS 180 for handling a command associated with a skill 291 corresponding to the second CPS 181. In some cases, the replanner component 150 may prescribe operations to effect a handoff of the command from the first CPS 180 to the second CPS 181 as described further below.

The replanner component 150 may be configured to determine when a requested CPS 180 or 181 differs from assistant selected CPS 180 or 181 for handling the command, and take action. For example, if a user utters a command, "Alexa, roll up the windows," an NLU component and/or a post-NLU ranker may determine that Alexa may not be the best assistant for activating features of a vehicle 110a, and that Hal may be a more appropriate assistant. Thus the NLU component and/or the post-NLU ranker may return skill and intent data, and further indicate a requested CPS 180 (in this case, corresponding to Alexa) and assistant selected CPS 181 (in this case, corresponding to Hal). The replanner component 150 may receive the NLU result data and based on the mismatch between requested and acting CPSs, generate plan data that the system 120 can parse to, for example, generate outputs indicating the handover execution of the user command from Alexa to Hal, and to further cause execution in response to the command by the application 124 and/or one of the skill components 291. Using the plan, the speech-processing system can provide the user with an indication of the handover followed by a response and/or an execution of the command, with each visual, verbal, and/or non-verbal output delivered in the style of the appropriate CPS 180 or 181 and timed to provide the user with an intuitive indication of the which assistant is handling the command. In some implementations, the replanner component 150 may be implemented as a skill component 290 or a skill system 125.

The assistant metadata component 155 may be a memory or storage configured to store information related to CPSs 180 and 181 provided by the system 120. The assistant metadata component 155 can store information about which CPS[s] is/are available for a given user, device 110, location, etc. The assistant metadata component 155 may store settings for CPSs 180 and 181 including which CPSs 180 or 181 are enabled for a particular user and/or device. The assistant metadata component 155 may store wakeword and/or gesture information associated with assistant CPS 180 or 181 for a given user and/or device 110. In some embodiments, the assistant metadata component 155 may mirror the information stored in the local settings component 130. The assistant metadata component 155 may store ASR, NLU, and/or entity libraries associated with each assistant for use by the system 120 during language processing. The assistant metadata component 155 may also store speech style information for each CPS 180 and 181 for use by a TTS component of the system 120 for providing verbal output in a style recognizable by a user as a personality indicating the identity of the assistant. The assistant metadata component 155 may store information regarding non-verbal indications of the CPS 180 and 181, such as colors, earcons, voice chromes, etc. indicative of the identity of an assistant. The assistant metadata component 155 may include one or more templates describing a syntax for plan data for different handoff types. Each handoff type may be associated with a template. The replanner component may 150 use a template to generate plan data according to a selected handoff type. Rules for choosing a handoff type and templates for generating corresponding plan data may also be provided by the assistant metadata component 155. The replanner component 150 may determine a handoff type to use based on parameters of the first plan data and/or other context. The replanner component 150 may retrieve a template for the determined handoff type from the assistant metadata component 155 and use the template to generate the plan data. The template may specify one or more sections (e.g., data fields) to be included in the plan, where each section corresponds to an operation to be performed by the system. The template may specify a format of the sections. For example, the template may describe an operation according to a handoff pre-roll; that is, a message informing a user that a CPS other than the requested CPS will handle the user's command. The template may describe that the pre-roll data field include an instruction to launch the replanner component 150 with a payload reflecting a setting of the first CPS for the purpose of generating a verbal message to the user using TTS settings associated with the first CPS. Similarly, the template may describe a post-roll data field that may be used for a barge-in handoff type. The post-roll data field may include an instruction to launch the replanner component 150 to generate a verbal message in a second speech style associated with the second CPS. The template may describe a command execution section that may include an instruction to call a skill or skill system based on a setting associated with the second CPS. The template may describe additional operations for other handoff types, including updating visual themes presented by the device for indicating visually which CPS is active at a given moment. The template may specify an order of the operations as reflected by the order of sections in the plan data. The replanner component 150 may use a template from the assistant metadata component 155 corresponding to the determined handoff type to generate plan data.

Figure 2:
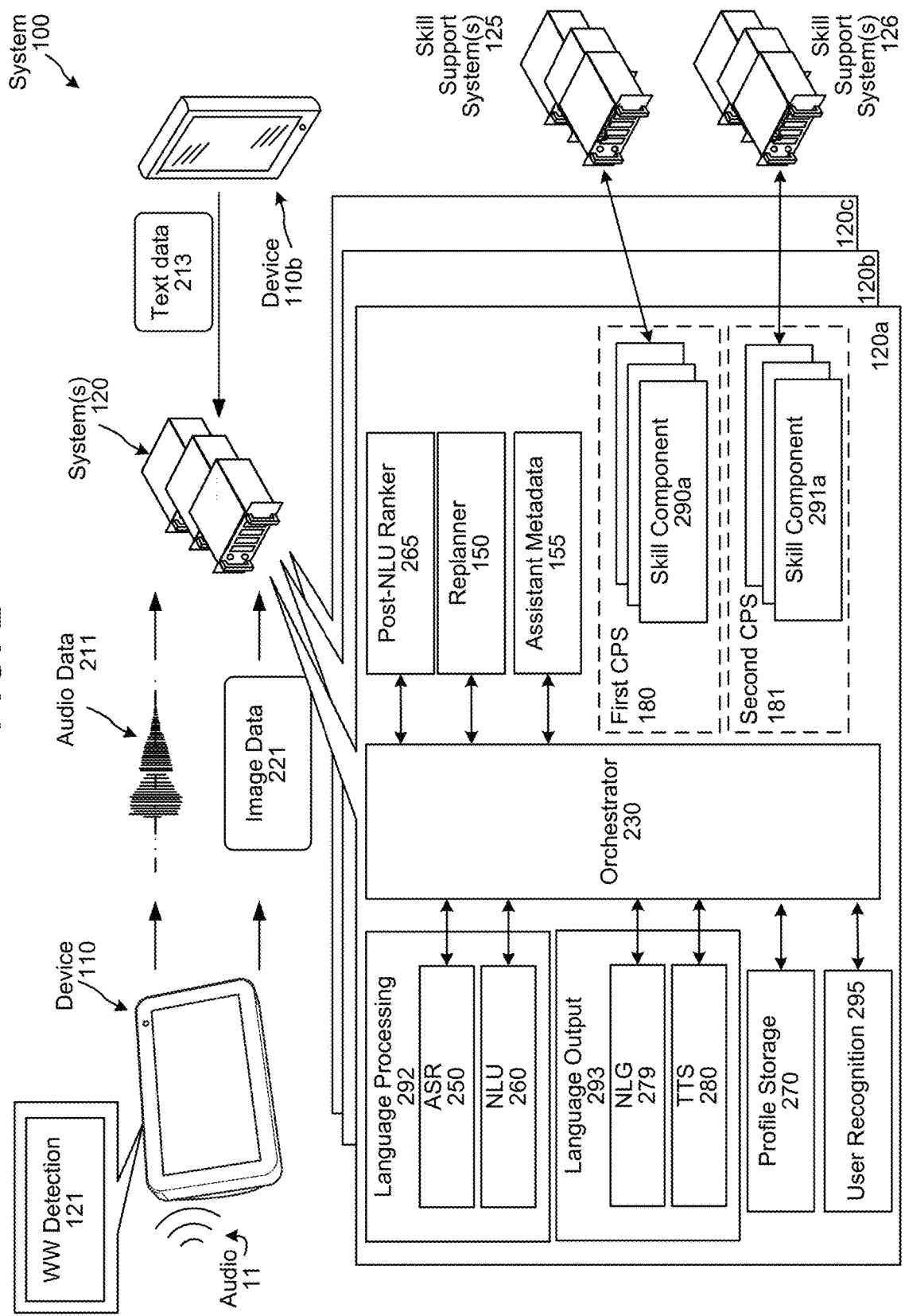
FIG. 2 is a conceptual diagram illustrating components of the virtual assistant system, according to embodiments of the present disclosure.

The system 100 may operate using various components as described in FIG. 2. FIG. 2 illustrates various components of the system 120 described with references to FIG. 1 as well as additional components. The various components may be located on same or different physical devices. For example, in some implementations, components of the system 120 may reside in the device 110 or be shared between the device 110 and the system 120 as described below with reference to FIG. 3. Communication between various components may occur directly or across a network(s) 199 connecting one or more of the devices 110, system 120, and/or skill support systems 125. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 121. The wakeword detection component 121 may be configured to detect various wakewords. In at least some examples, each wakeword may correspond to a name of a different digital assistant corresponding to a different CPS 180 or 181. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) 1518 of the device 110 and may send image data 221 representing those image(s) to the system 120. The image data 221 may include raw image data or image data processed by the device 110 before sending to the system 120.

The wakeword detector 121 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 121 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 121 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 121 and/or input is detected by an input detector, the device 110 may "wake" and begin transmitting audio data 211, representing the audio 11, to the system(s) 120. The audio data 211 may include data corresponding to the wakeword; in other embodiments, the portion of the audio corresponding to the wakeword is removed by the device 110 prior to sending the audio data 211 to the system(s) 120. In the case of touch input detection or gesture based input detection, the audio data may not include a wakeword.

The input detector 122 of the device 110 may detect user input such as a gesture (e.g., a button press or touch-screen touch). An example button is a "Push to Talk" button. The device 110 may send the audio data 211 captured after gesture detection to the system(s) 120. The button and/or the input detector 122 may be capable of differentiating gestures such as tap-to-talk, push-and-hold, double-click, etc. In any event, the device 110 sends the audio data 211 or data representing the received audio 11 and/or commands conveyed therein to the server 120.

In some implementations, the system 100 may include more than one system 120. The systems 120 may respond to different wakewords and/or gestures, and/or perform different categories of tasks. Each system 120 may be associated with its own wakeword such that speaking a certain wakeword results in audio data be sent to and processed by a particular system. For example, detection of the wakeword "Alexa" by the wakeword detector 121 may result in sending audio data to system 120a for processing while detection of the wakeword "Hal" by the wakeword detector 121 may result in sending audio data to system 120b for processing.

In some implementations, the system 100 may include more than one CPS 180 and 181, each representing a virtual assistant having a different "personality" and abilities to provide different services and/or access to different skills. Each CPS 180 or 181 may be invoked by a different wakeword and/or gesture. The system 100 may have a separate wakeword and system for different skills/systems (e.g., "Dungeon Master" for a game play skill/system 120c) and/or such skills/systems may be coordinated by one or more skill(s) 290 of one or more systems 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 211 to a language processing component 292. The language processing component 292 (sometimes also referred to as a spoken language understanding (SLU) component) includes an automatic speech recognition (ASR) component 250 and a natural language understanding (NLU) component 260. The ASR component 250 may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in greater detail below with regard to FIG. 9.

The speech processing system 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system(s) 120, a skill component 290, a skill system(s) 225, etc.) to execute the intent. For example, if the text data corresponds to "play the 5$^{th}$ Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora such as "this song" or "my next appointment"—the speech processing system 292 can send a decode request to another speech processing system 292 for information regarding the entity mention and/or other context related to the utterance. The speech processing system 292 may augment, correct, or base results data upon the audio data 211 as well as any data received from the other speech processing system 292.

In some implementations, the NLU component 260 and/or the ASR component 250 may leverage models, grammars, lexicons, and/or other libraries of data for use in processing natural language inputs. Performance of the system 100 may be improved through use of libraries specific to the virtual assistants available via the system or currently enabled for a particular user/device 110 providing the natural language input. Upon receiving input data related to a natural language input, the system 120 may retrieve a list of enabled and/or available CPSs 180 and 181, e.g., from the profile storage 270 and/or the assistant metadata component 155, and process the natural language input based on libraries associated with the assistants present in the list(s).

The NLU component 260 may return NLU results data 1185/1125 (which may include tagged text data, indicators of intent, etc.) back to the orchestrator 230. The orchestrator 230 may forward the NLU results data to a skill component(s) 290. If the NLU results data includes a single NLU hypothesis representing a skill associated with the CPS 180 or 181 corresponding to the assistant invoked by the user command, the NLU component 260 and the orchestrator component 230 may direct the NLU results data to the skill component(s) 290 associated with the NLU hypothesis. If the NLU results data 1185/1125 includes an N-best list of NLU hypotheses, the NLU component 260 and the orchestrator component 230 may direct the top scoring NLU hypothesis to a skill component(s) 290 associated with the top scoring NLU hypothesis. The system may also include a post-NLU ranker 265 which may incorporate other information to rank potential interpretations determined by the NLU component 260. The local device 110 may also include its own post-NLU ranker 365, which may operate similarly to the post-NLU ranker 265. The NLU component 260, post-NLU ranker 265 and other components are described in greater detail below with regard to FIGS. 10 and 11.

A skill component may be software running on the system(s) 120 that is akin to a software application. That is, a skill component 290 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 290 may operate in conjunction between the system(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) 125 may communicate with a skill component(s) 290 within the system(s) 120 and/or directly with the orchestrator component 230 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 290 dedicated to interacting with the skill support system(s) 125. Unless expressly stated otherwise, reference to a skill, skill device, or skill component may include a skill component 290 operated by the system(s) 120 and/or skill operated by the skill support system(s) 125. Moreover, the functionality described herein as a skill or skill may be referred to using many different terms, such as an action, bot, app, or the like. The skill 290 and or skill support system(s) 125 may return output data to the orchestrator 230.

Skills 290 and 291 may be associated with a particular CPS 180 or 181. In some cases, the system 120 may determine that assistant CPS 180 or 181 other than the CPS 180 or 181 invoked by the input data (e.g., indicated by a wakeword and/or gesture received with input audio data) is better able to handle a request or command represented in the input data. For example, the input data may indicate an intent corresponding to a skill that is not enabled for the requested CPS. In such cases, the orchestrator component 230 may provide the NLU result data along with the requested assistant to the replanner component 150. The replanner component 150 may determine that the requested assistant (e.g., corresponding to CPS 180) does not match the selected assistant (e.g., corresponding to CPS 181) for handling the skill/intent indicated by the NLU result data. Accordingly, the replanner component 150 may generate plan data indicating additional operations the system 120 may take with respect to the input data. The replanner component 150 may return the plan data to the orchestrator component 230 for further processing.

The system 120 includes a language output component 293. The language output component 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data 1410 discussed below). Alternatively or in addition, the TTS component 280 may receive text data from a skill 290 or other system component for output.

The NLG component 279 may include a trained model. The NLG component 279 generates text data 1410 from dialog data received by the dialog manager 272 such that the output text data 1410 has a natural feel and, in some embodiments, includes words and/or phrases specifically formatted for a requesting individual. The NLG may use templates to formulate responses. And/or the NLG system may include models trained from the various templates for forming the output text data 1410. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

In some cases, the system 100 may provide access to multiple assistants via the CPSs 180 and 181 of the device 110 and/or the system 120. Each assistant may have its own personality as reflected in particular speech style. The language output component 293 may therefore provide different synthesized speech depending on the corresponding CPS 180 or 181. The language output component 293 may receive assistant metadata from the orchestrator 230, skill 290/91, and/or the replanner component 150, etc. The language output component 293 may retrieve speech style data for the CPS 180 or 181 corresponding to the active assistant from the assistant metadata component 155. The language output component 293 may use the speech style data to generate synthesized speech matching the personality of the active assistant.

Figure 13:
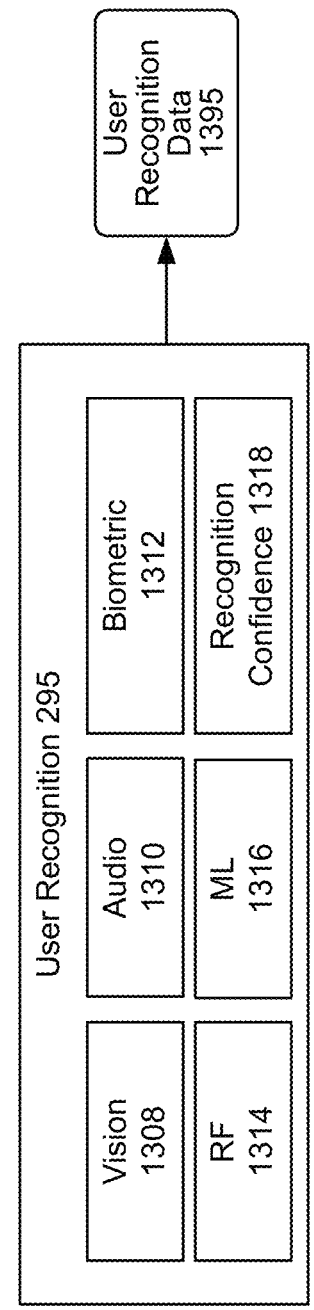
FIG. 13 is a schematic diagram of an illustrative architecture in which sensor data is combined to recognize one or more users according to embodiments of the present disclosure.

The system(s) 120 may include a user recognition component 295 that recognizes one or more users using a variety of data, as described in greater detail below with regard to FIG. 13. However, the disclosure is not limited thereto, and the device 110 may include a user recognition component 395 instead of and/or in addition to user recognition component 295 of the system(s) 120 without departing from the disclosure. User recognition component 395 operates similarly to user recognition component 295.

User recognition data 1395 resulting from a user recognition process may be used to, for example, determine CPSs 180 and 181 enabled for a particular user with respect to the device 110. In some cases, different wakewords and/or gestures may be assigned to different CPSs 180 and 181 for different users. For example, a first user may use the wakeword "Hal" for an automobile CPS 180, while a second user may use the wakeword "Carja" for the automobile CPS 180. In another example, the first user may access Hal using a tap-to-talk gesture while the second user may access Carja using a press-and-hold gesture.

The user-recognition component 295 may take as input the audio data 211 and/or text data output by the ASR component 250. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.), received by the system in correlation with the present user input, to stored biometric data of users assuming user permission and previous authorization. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various user identifying data. Each user profile may also include data corresponding to preferences of the user. For example, each user profile may include a list of assistants enabled for the user with respect to a given device. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 3:
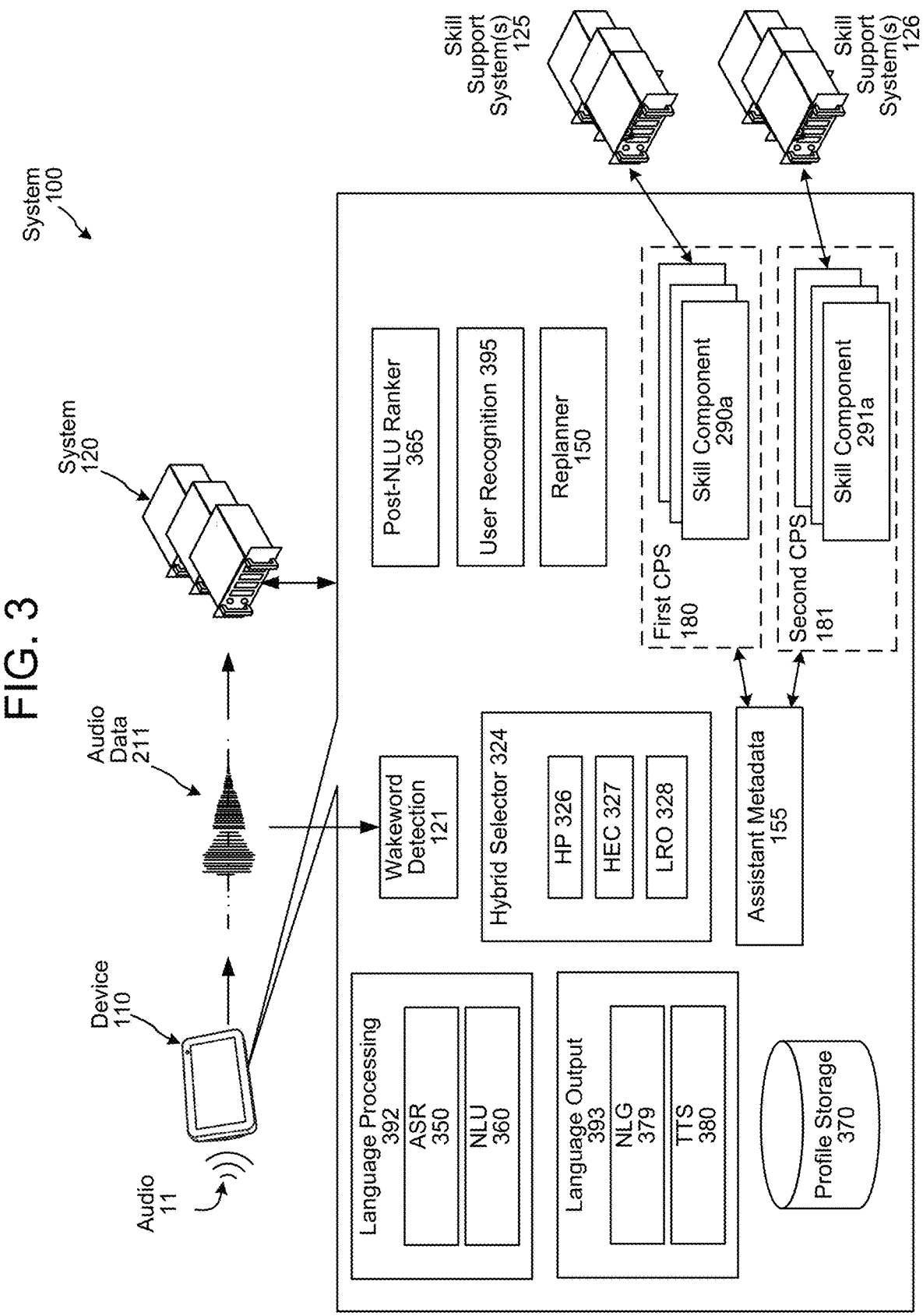
FIG. 3 is a conceptual diagram illustrating components that may be included in a device of the virtual assistant system, according to embodiments of the present disclosure.

Although the components of FIG. 2 may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 3 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 121 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 121. If the wakeword detection component 121 detects a wakeword in the audio data 211, the wakeword detection component 121 may send an indication of such detection to the hybrid selector 324. In response to receiving the indication, the hybrid selector 324 may send the audio data 211 to the system 120 and/or the ASR component 350. The wakeword detection component 121 may also send an indication, to the hybrid selector 324, representing a wakeword was not detected. In response to receiving such an indication, the hybrid selector 324 may refrain from sending the audio data 211 to the system 120, and may prevent the ASR component 350 from further processing the audio data 211. In this situation, the audio data 211 can be discarded.

The device 110 may conduct its own speech processing using on-device language processing components, such as an SLU/language processing component 392 (which may include an ASR component 350 and an NLU 360), similar to the manner discussed herein with respect to the SLU component 292 (or ASR component 250 and the NLU component 260) of the system 120. Language processing component 392 may operate similarly to language processing component 292, ASR component 350 may operate similarly to ASR component 250 and NLU component 360 may operate similarly to NLU component 260. The device 110 may also internally include, or otherwise have access to, other components such as one or more skill components 390 capable of executing commands based on NLU output data or other results determined by the device 110/system 120 (which may operate similarly to skill components 290), a user recognition component 395 (configured to process in a similar manner to that discussed herein with respect to the user recognition component 295 of the system 120), profile storage 370 (configured to store similar profile data to that discussed herein with respect to the profile storage 270 of the system 120), or other components. In at least some embodiments, the profile storage 370 may only store profile data for a user or group of users specifically associated with the device 110. Similar to as described above with respect to skill component 290, a skill component 390 may communicate with a skill system(s) 125. The device 110 may also have its own language output component 393 which may include NLG component 379 and TTS component 380. Language output component 393 may operate similarly to language processing component 293, NLG component 379 may operate similarly to NLG component 279 and TTS component 380 may operate similarly to TTS component 268.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of local language processing when new audio data 211 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the system 120 or the local language processing components. However, the disclosure is not limited thereto, and in some examples the hybrid selector 324 may send the audio data 211 only to the local ASR component 350 without departing from the disclosure. For example, the device 110 may process the audio data 211 locally without sending the audio data 211 to the system 120.

The local ASR component 350 is configured to receive the audio data 211 from the hybrid selector 324, and to recognize speech in the audio data 211, and the local NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s).

Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 211 to the system 120, and the response data from the system 120 may include the unique identifier to identify which natural language user input the response data corresponds.

In at least some embodiments, the device 110 may include, or be configured to use, one or more skill components 390 that may work similarly to the skill component(s) 290 implemented by the system 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 390, a skill system 125, or a combination of a skill component 390 and a corresponding skill system 125.

Similar to the manner discussed with regard to FIG. 2, the local device 110 may be configured to recognize multiple different wakewords and/or perform different categories of tasks depending on the wakeword. Such different wakewords may invoke different processing components of local device 110 (not illustrated in FIG. 3). For example, detection of the wakeword "Alexa" by the wakeword detector 121 may result in sending audio data to certain language processing components 392/skills 390 for processing while detection of the wakeword "Computer" by the wakeword detector 121 may result in sending audio data different language processing components 392/skills 390 for processing.

Figure 4:
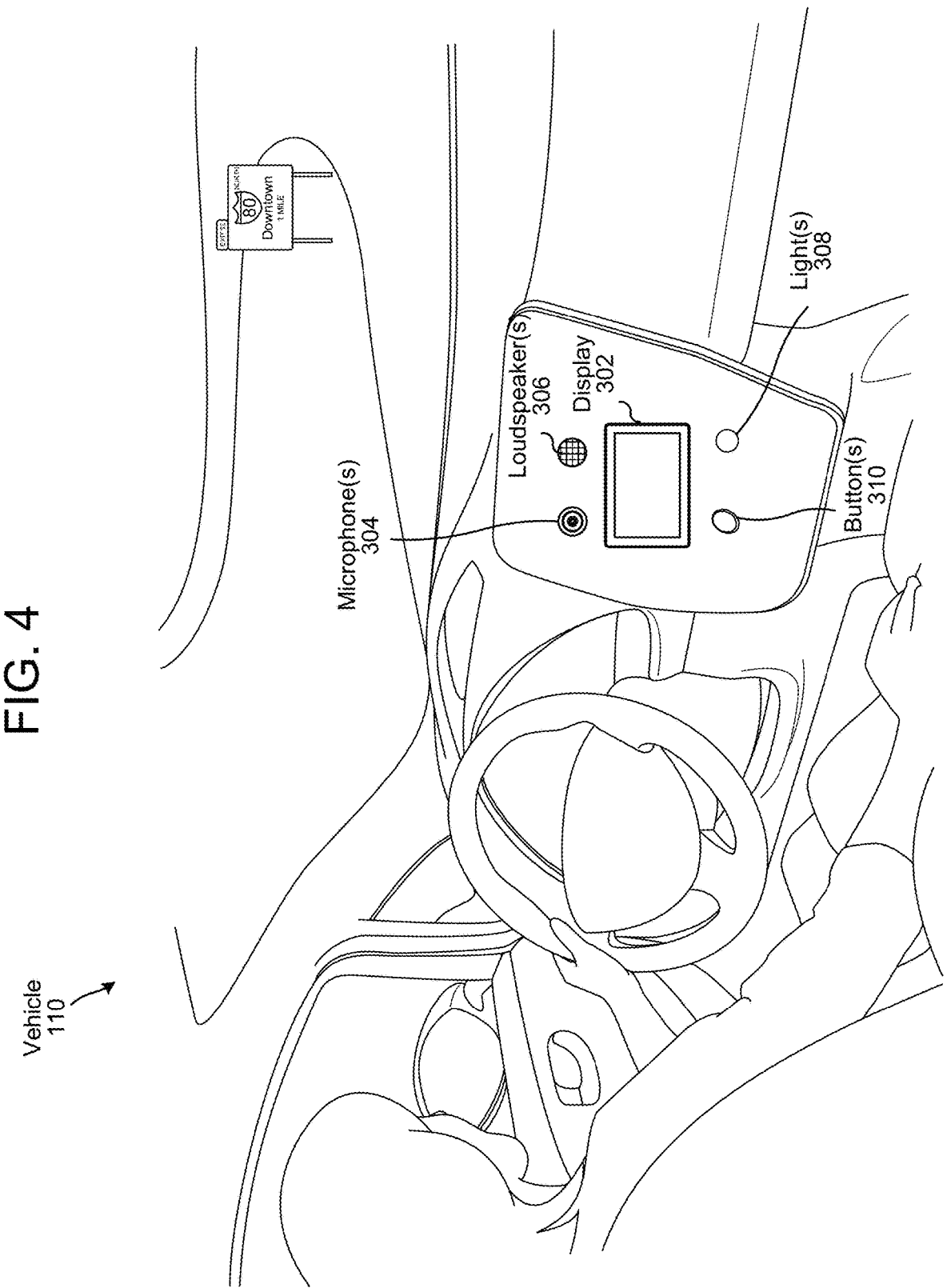
FIG. 4 illustrates a vehicle-based user interface according to embodiments of the present disclosure.

FIG. 4 illustrates a vehicle-based user interface according to embodiments of the present disclosure. FIG. 4 illustrates an interior of the vehicle 110a. The vehicle 110a may include, on a dashboard, steering wheel, heads-up display, or other interior surface or feature, such as a display 302, which may be a touchscreen display. The vehicle 110a may further include one or more microphones 304, which may be used to receive audio that includes an utterance and generate corresponding input audio data. One or more loudspeakers 306 may be used to output audio corresponding to output audio data, which may be received from the system 120. One or more lights 308 may be used to display information; in some embodiments, the lights 308 are used to identify a speech processing system being used to provide output audio and/or perform a task. For example, one light 308 may be illuminated when a first speech processing system is being used to output audio and/or perform an action, and a second light 308 may be illuminated when a second speech processing system is being used. In another example, a light 308 is illuminated using a first color (e.g., blue) when a first speech processing system is being used, and same light 308 is illuminated using a second color (e.g., green) when a second speech processing system is being used. The vehicle 110a may further include one or more buttons 310, dials, switches, triggers, or other such user-input devices. In some embodiments, when the vehicle 110a detects activation of a button 310 and/or touching of the display 302, the microphone 304 captures audio, and the vehicle 110 sends corresponding audio data to the system 120. The vehicle 110a may invoke different assistants depending on the manner of button activation; for example, a tap-to-talk may invoke a first CPS 180 and a press-and-hold may invoke a second CPS 181. In other embodiments, the vehicle 110a continually receives audio data captured by the microphone 304 and sends corresponding audio data to the system 120 when the vehicle 110a detects a wakeword in the audio data (as described in greater detail below).

Figure 5:
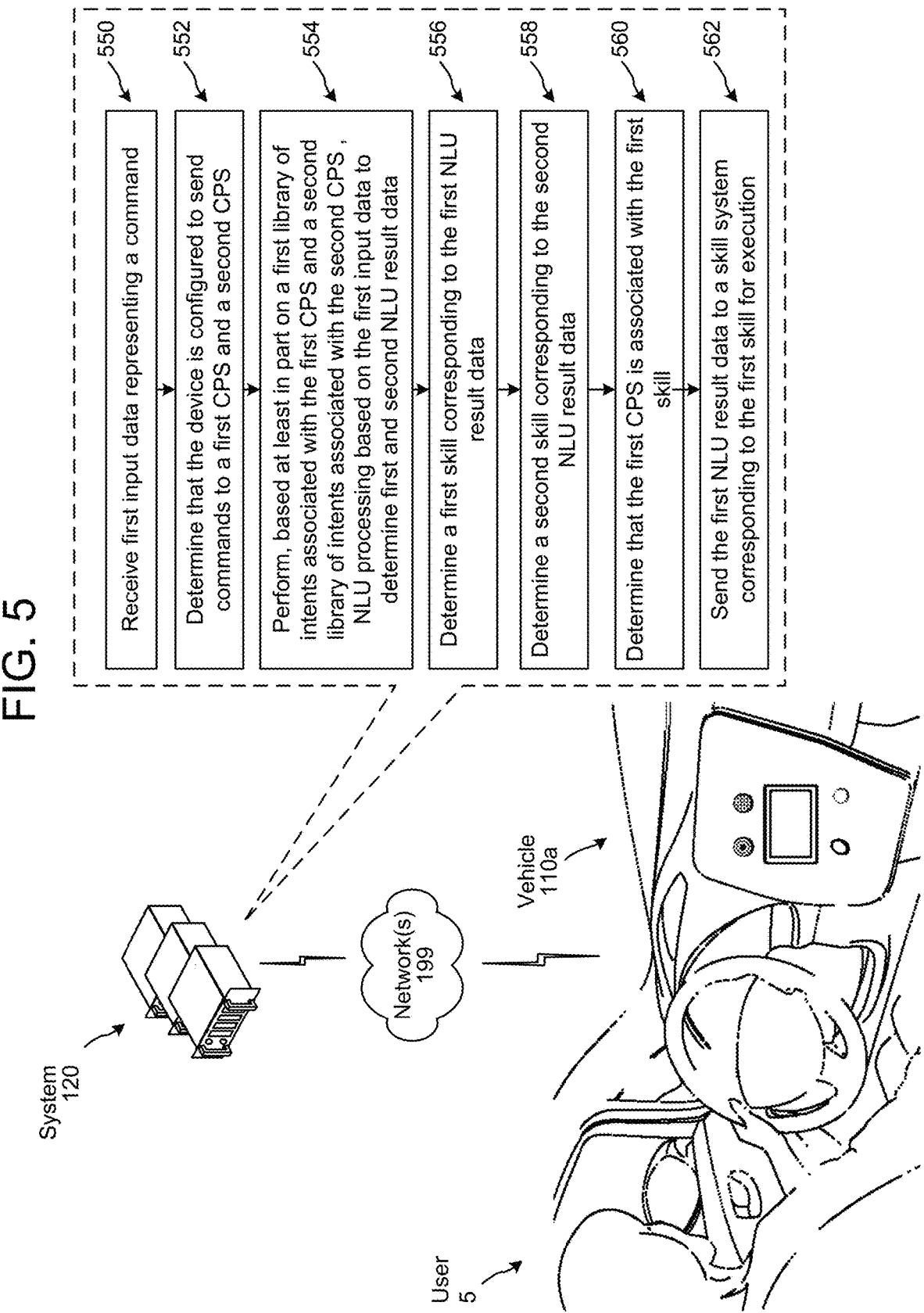
FIG. 5 is a conceptual diagram illustrating first example operations of the virtual assistant system, according to embodiments of the present disclosure.

FIG. 5 is a conceptual diagram illustrating first example operations of the virtual assistant system 100, according to embodiments of the present disclosure. In the example operations shown in FIG. 5, the system 100 leverages information about eligible assistants during language processing. As shown in FIG. 5, the virtual assistant system 100 may include a voice-enabled device in a vehicle 110a local to a user 5, a natural language command processing system 120 (abbreviated "system 120") connected across one or more networks 199. Although the voice-enabled device 110 shown in FIG. 5 is a vehicle 110a, the same operations could be performed by any other voice-enabled device 110 including the examples shown in FIG. 17. Although the figures and discussion of the present disclosure illustrate certain steps in a particular order, the steps described may be performed in a different order (as well as certain steps removed or added) without departing from the present disclosure.

The device 110 may receive audio corresponding to a spoken natural language input originating from the user 5. The device 110 may process audio following detection of a wakeword and/or a gesture. The device 110 may generate audio data corresponding to the audio, and may send the audio data to the system 120. The device 110 may send the audio data to the system 120 via an application that is installed on the device 110 and associated with the system 120. An example of such an application is the Amazon Alexa application that may be installed on a smart phone, tablet, or the like. In some implementations, the device 110 may receive text data 213 corresponding to a natural language input originating from the user 5, and send the text data to the system 120. The device 110 may also receive output data from the system 120, and generate a synthesized speech output. The device 110 may include a camera for capturing image and/or video data for processing by the system 120. Examples of various devices 110 are further illustrated in FIG. 17. The system 120 may be remote system such as a group of computing components located geographically remote from device 110 but accessible via network 199 (for example, servers accessible via the internet). The system 120 may also include a remote system that is physically separate from device 110 but located geographically close to device 110 and accessible via network 199 (for example a home server located in a same residence as device 110. System 120 may also include some combination thereof, for example where certain components/operations are performed via a home server(s) and others are performed via a geographically remote server(s).

The following describes example operations for answer prediction in a speech processing system. The system 100 may receive, from a first device 110, first input data representing a command (550). The input data may be in the form of audio data generated based on speech detected by a microphone of the first device 110, text data received by the first device 110, or other data representing contents of a natural language input. The system 100 may determine that the first device 110 is configured to send commands to at least one of a first command processing subsystem (CPS) and a second CPS (552). The system 100 may determine eligible and/or available CPSs based on one or more of a user profile associated with the first device, a device type of the first device, a location of the device, or a second device paired to the first device. The system 100 may retrieve a list of CPS from, for example, an assistant metadata component that lists CPS available for a given user, device, and/or location. The system 100 may retrieve a list of CPS from, for example, a profile storage that lists CPS enabled for a given user account, group account, and/or device identifier. The system 100 may use the list of CPS to identify resources such as models, grammars, lexicons, and/or other libraries for use in language processing.

For a spoken language input, the system 100 may perform, based at least in part on a first acoustic and/or language model associated with the first CPS and a second acoustic and/or language associated with the second assistant, ASR processing based on the first input data to determine first ASR result data. The system 100 may perform, based at least in part on a first library of intents associated with the first CPS and a second library of intents associated with the second CPS, NLU processing based on the first input data (e.g., using the ASR result data) to determine first NLU result data including a first intent and second NLU result data including a second intent (554). The NLU result data may include one or more NLU hypotheses. Each NLU hypothesis may include and intent and possibly slot data indicating, for example, an entity associated with the intent.

The system 100 may determine a first skill corresponding to the first NLU result data (556), and a second skill corresponding to the second NLU result data (558). A post-NLU ranker may receive the NLU result data and the list of eligible and/or available CPS and generate a set of CPS-skill-intent tuples. The post-NLU ranker may then remove tuples with invalid skill-intent pairs.

The system 100 may determine that the first CPS is associated with the first skill (560). The post-NLU ranker may return tuples where the given CPS is configured to work with the given skill. In doing so, the post-NLU ranker may filter out tuples where the given CPS is not configured with access to the given skill. For example, a first CPS may not be configured for access to certain skills such as shopping and weather, but not other skills such as an automobile skill or application.

The system 100 may, based at least on determining that first CPS is associated with the first skill, send the first NLU result data to a first skill system corresponding to the first skill for execution (562).

In this example, the system 100 selects the first CPS for handling the command represented in the input data. In some cases, the input data may include an indication of a requested CPS; for example, because the device 110 detected a wakeword and/or a gesture associated the requested CPS. If the requested CPS does not match the selected CPS, the system 100 may execute a handoff from the requested CPS to the selected CPS. The mismatch could be due to a user accidentally invoking the wrong CPS, the requested CPS either not being available or enabled for the device 110, and/or the user invoking a CPS to handle a command for which the CPS does not have access to the necessary skill.

In some implementations, the device 110 may give visual and/or audible indications of which CPS is active at a given time. For example, upon detecting a wakeword and/or gesture associated with a first CPS, the device 110 may output a message in a speech style associated with the first CPS and/or output a visual indication associated with the first CPS. Upon selecting a second CPS to handle the command, the system 110 may perform a handoff. The handover may include audible and/or visual indications of a transfer of handling of the command from the first CPS to the second CPS. For example, the handoff may include a first message in the speech style associated with the first CPS indicating that the second CPS will handle the command. The handoff may additionally or alternatively include a second message in the speech style associated with the second CPS indicating that it has taken over handling of the command. The handoff may include a change in the presentation a visual theme indicating the active CPS. For example, a light color and/or pattern emitted by a light of the device 110 may change from a first style associated with the first CPS to a second style associated with the second CPS. A handoff type including which messages and visual indications are to be delivered by which CPS at which time can be specified by settings in the assistant metadata component, and may, in some implementations, depend on context of the handover such as the skill-intent pair and/or identities of the first and/or second CPS. In some implementations, handoff type may be based on user customizable settings stored in the assistant metadata component and/or the profile storage.

Figure 6:
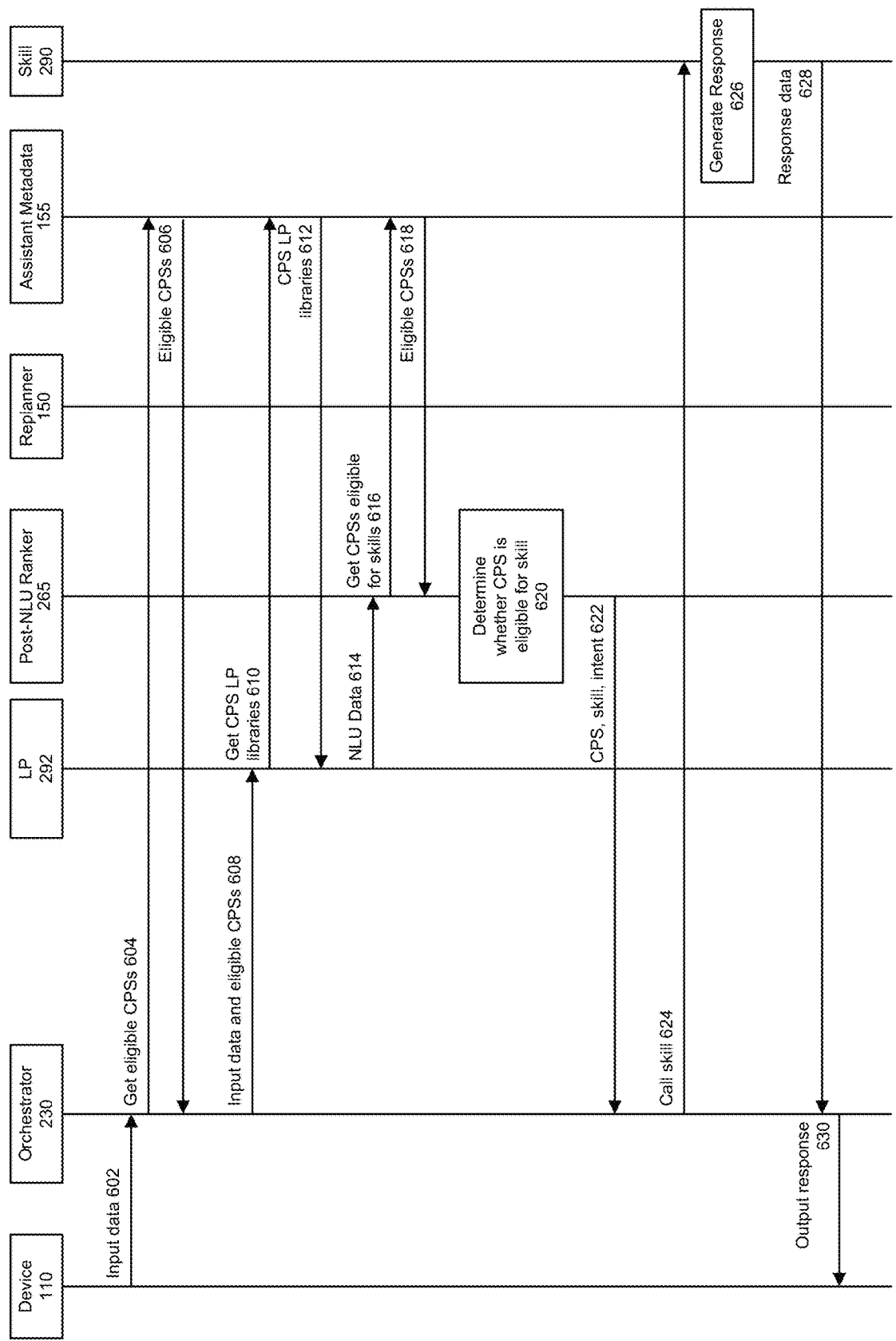
FIG. 6 is a signal flow diagram further illustrating the first example operations of the virtual assistant system, according to embodiments of the present disclosure.

FIG. 6 is a signal flow diagram further illustrating the first example operations of the virtual assistant system 100, according to embodiments of the present disclosure. In the example operations shown in FIG. 6, the system 100 leverages information about eligible CPSs during language processing. The diagram illustrates communications between the device 110, the orchestrator component 230, the language processing component 292, the post-NLU ranker 265, the replanner component 150, the assistant metadata component 155, and a skill 290. Some operations may be omitted for clarity.

The device 110 may receive input representing, for example, a command: "Call Bob." The command may be accompanied by a gesture such as a press of the button or preceded by a wakeword. The device 110 may transmit 602 data representing the input to the remote system 120. An orchestrator component 230 of the remote system 120 may receive the input data. To improve the quality of language processing results, speed up language processing, and/or reduce the computational resources required for language processing, the system 120 may obtain information related to available CPS for handling the command. Accordingly, the orchestrator component 230 may query 604 the assistant metadata component 155 for a list of eligible CPS. The list of eligible CPS may include CPS enabled for use in handling commands received by the device 110, or assistants available for use in handling commands received by the device 110, whether or not the assistants are enabled for the device 110. The assistant metadata component 155 may return the list of eligible CPS 606. The orchestrator component 230 of the remote system 120 may forward 608 the input data and the list of eligible CPS to the LP component 292. The LP component 292 may perform ASR and/or NLU processing on the data. The LP component 292 may use the available CPS information to augment and/or narrow data used for processing input data. For example, an ASR component 250 of the LP component 292 may load one or more of an acoustic model 953, FST 955, and/or language model 954 for each available CPS. Similarly, an NLU component 260 may load one or more skill system grammars 1076, skill system intents 1074, skill system lexicons 1086, etc. for each available CPS. Accordingly, the LP component 292 may retrieve 610 one or more libraries associated with eligible CPSs from the assistant metadata component 155. The assistant metadata component 155 may return 612 the requested data to the language processing component 292. The language processing component 292 may process the input data using the libraries, and forward 614 the NLU result data to the post-NLU ranker 265. The NLU result data may include one or more hypotheses including an intent and slot data. The post-NLU ranker 265 may perform operations such as determining a skill for performing the intent/slot combination, CPS configured to handle commands that invoke the skill, filtering out invalid skill/intent/CPS combinations, and reranking the NLU result data. The post-NLU reranker 292 can call 616 the assistant metadata component 155 to obtain 616 a list of one or more CPS eligible for handling the command represented in the input data. The list of eligible CPS returned 618 by the assistant metadata component 155 in step 618 may be the same or different from the list of eligible CPS provided in step 606. For example, the list of eligible assistants returned in step 606 may include all assistants available to the user and/or device 110 at the device's current location; while the list of eligible assistants returned in step 618 may only include assistants enabled for the device 110 and associated with skills determined by the post-NLU ranker 265. The post-NLU ranker 265 may determine 620 whether or not a particular CPS is configured to handle commands with respect to a particular skill represented in the NLU result data. The post-NLU ranker 265 can return 622 a highest ranked CPS/skill/intent combination or a ranked list of CPS/skill/intent combinations. The orchestrator component 230 may call 624 the skill component 290 identified by the CPS/skill/intent combination with data for processing. The data may include the intent, slot data, and/or an identity of the CPS. The skill component 290 may generate 626 response data and return 628 it to the orchestrator component 230. The orchestrator component 230 may cause 630 the device 110 to output data representing the response data by, for example, calling on the TTS component 280 to generate synthesized speech in a speech style associated with the CPS.

Figure 7:
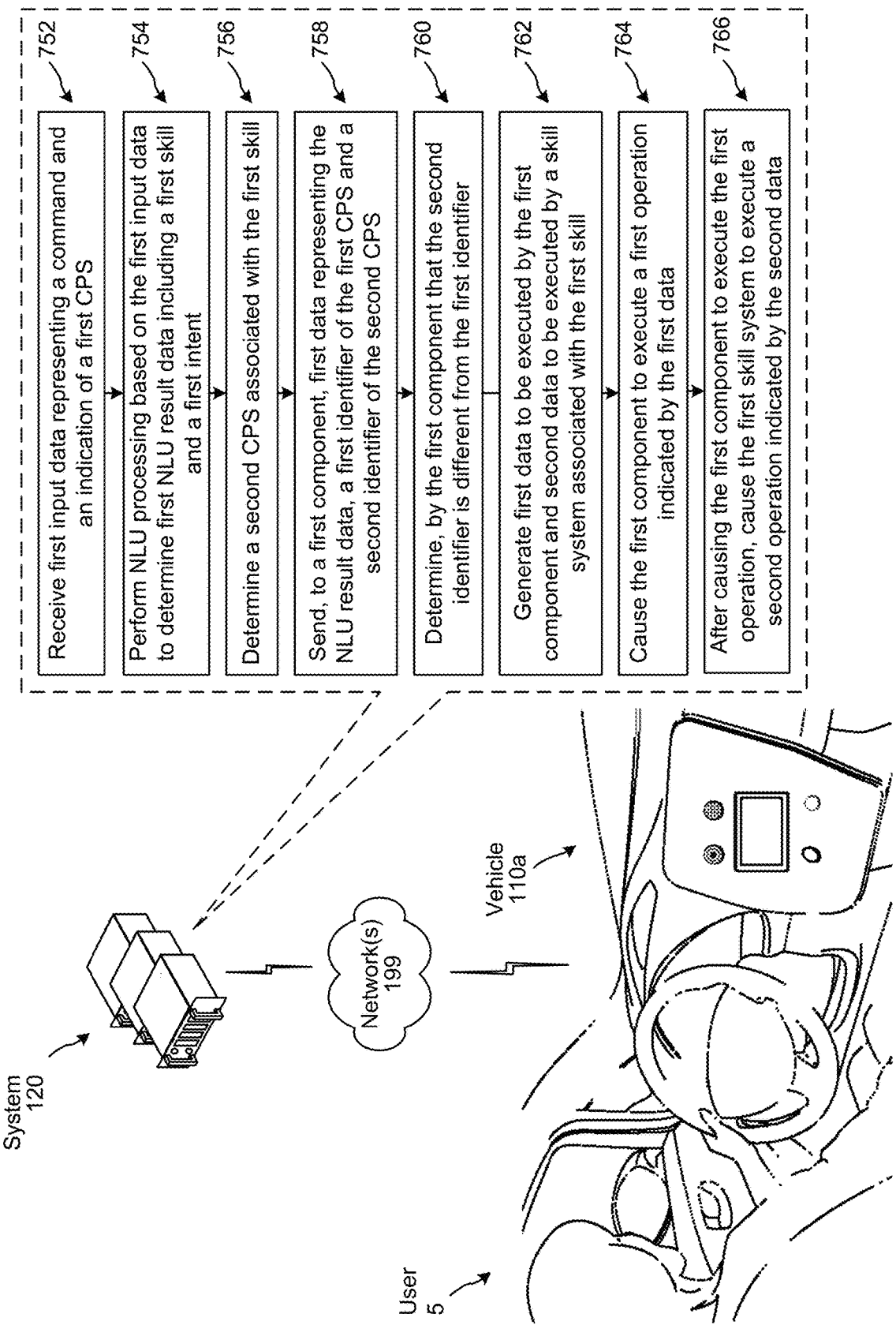
FIG. 7 is a conceptual diagram illustrating second example operations of the virtual assistant system, according to embodiments of the present disclosure.

FIG. 7 is a conceptual diagram illustrating second example operations of the virtual assistant system 100, according to embodiments of the present disclosure. In the example operations shown in FIG. 7, the system 100 invokes a replanner component to generate plan data for handling a handover from a requested assistant to an active assistant, and executing a requested action. As shown in FIG. 7, the virtual assistant system 100 may include a voice-enabled device in a vehicle 110a local to a user 5, a natural language command processing system 120 (abbreviated "system 120") connected across one or more networks 199. Although the voice-enabled device 110 shown in FIG. 7 is a vehicle 110a, the same operations could be performed by any other voice-enabled device 110 including the examples shown in FIG. 17. Although the figures and discussion of the present disclosure illustrate certain steps in a particular order, the steps described may be performed in a different order (as well as certain steps removed or added) without departing from the present disclosure.

The following describes example operations for answer prediction in a speech processing system. The system 100 may receive, from a first device 110, first input data representing a command and an indication of a first command processing subsystem (CPS); for example, the CPS 180 or 181 previously described (752). The input data may be in the form of audio data generated based on speech detected by a microphone of the first device 110, or text data received by the first device 110. The input data may be a textual, phonetic, or other representation of a spoken input.

For a spoken language input, the system 100 may perform ASR processing based on the first input data to determine first ASR result data. The system 100 may perform natural language understanding (NLU) processing based on the first input data (e.g., using the ASR result data) to determine first NLU result data including a first skill and a first intent (754). The system 100 may determine a second CPS associated with the first skill (756). In some cases, the NLU result data may include one or more NLU hypotheses. Each NLU hypothesis may include and intent and possibly slot data indicating, for example, an entity associated with the intent. A post-NLU ranker may receive the NLU result data and the list of eligible and/or available CPSs and generate a set of CPS-skill-intent tuples. The post-NLU ranker may then remove tuples with invalid skill-intent pairs, and rank the remaining CPS-skill-intent tuples. The post-NLU ranker may determine a best ranked tuple. The post-NLU ranker may output the best ranked tuple along with an indication of the requested CPS.

The system 100 may send, to a first component, first data representing the NLU result data, assistant first identifier of the first CPS, and a second identifier of the second CPS (758). The first component may be, for example, a replanner component such as the replanner component 150 previously described. The replanner component may receive the CPS-skill-intent tuple output by the post-NLU ranker, along with an indication of the requested CPS indicated in the first input data.

The system 100 may determine that the second identifier is different from the first identifier (760). In some cases, the first component may determine that the requested CPS does not match the selected CPS for the skill-intent pair. Accordingly the first component may generate plan data describing operations for performing a handoff of the command represented in the first input data.

The system 100 may, in response to determining that the second identifier is different than the first identifier, generate first data to be executed by the first component (e.g., the replanner) and second data to be executed by a first skill system associated with the first skill using a setting corresponding to the first assistant second assistant (762). The first data and second data may represent plan data indicating sequential operations the system 100 may take to effect the handoff. The first component may generate the first data to represent a first operation to be executed by the first component based on a first setting corresponding to the first CPS. The setting may be, for example, a TTS setting for generating synthetic speech in a first speech style associated with the first CPS. The first component may generate the second data to represent a second operation to be executed by the skill system. The second operation may represent, for example, sending the command to the skill system for execution. The first component may generate the first and second data based on settings stored in the assistant metadata component. For example, the assistant metadata component may dictate a handoff type based on intent and/or slot data, or based on the identity of the first and/or second assistant. The handoff type may correspond to a template stored in the assistant metadata component.

The system 100 may cause the first component to execute a first operation indicated by the first data using the setting corresponding to the first CPS (764). The operation may be, for example, outputting a message reflecting the personality of the first assistant indicating a handoff of the command to the second assistant. The operation may be performed by the first component, and may include retrieving message data from the assistant metadata component and generating, via the TTS component, synthesized speech in a speech style of the first CPS.

The system 100 may, after causing the first component (e.g., the replanner component) to execute the first operation, cause the first skill system to execute a second operation indicated by the second data (766). The system 100 may send instructions including the intent, selected CPS, and/or slot data to the skill for execution. The skill may perform an action and/or return response data. The system 100 may cause the device 110 to output synthesized speech based on the response data and in a speech style associated with the second CPS.

In some implementations, the plan data may additionally include action items for changing output visual theme presented by the device 110. For example, upon detecting a wakeword and/or gesture associated with the first assistant, the device may emit a light color and/or pattern and/or display an image (e.g., a voice chrome) associated with the first CPS. The first component may, however, may generate additional plan data for causing the device to change the visual theme to a style associated with the second CPS at a time of the handoff.

Figure 8A:
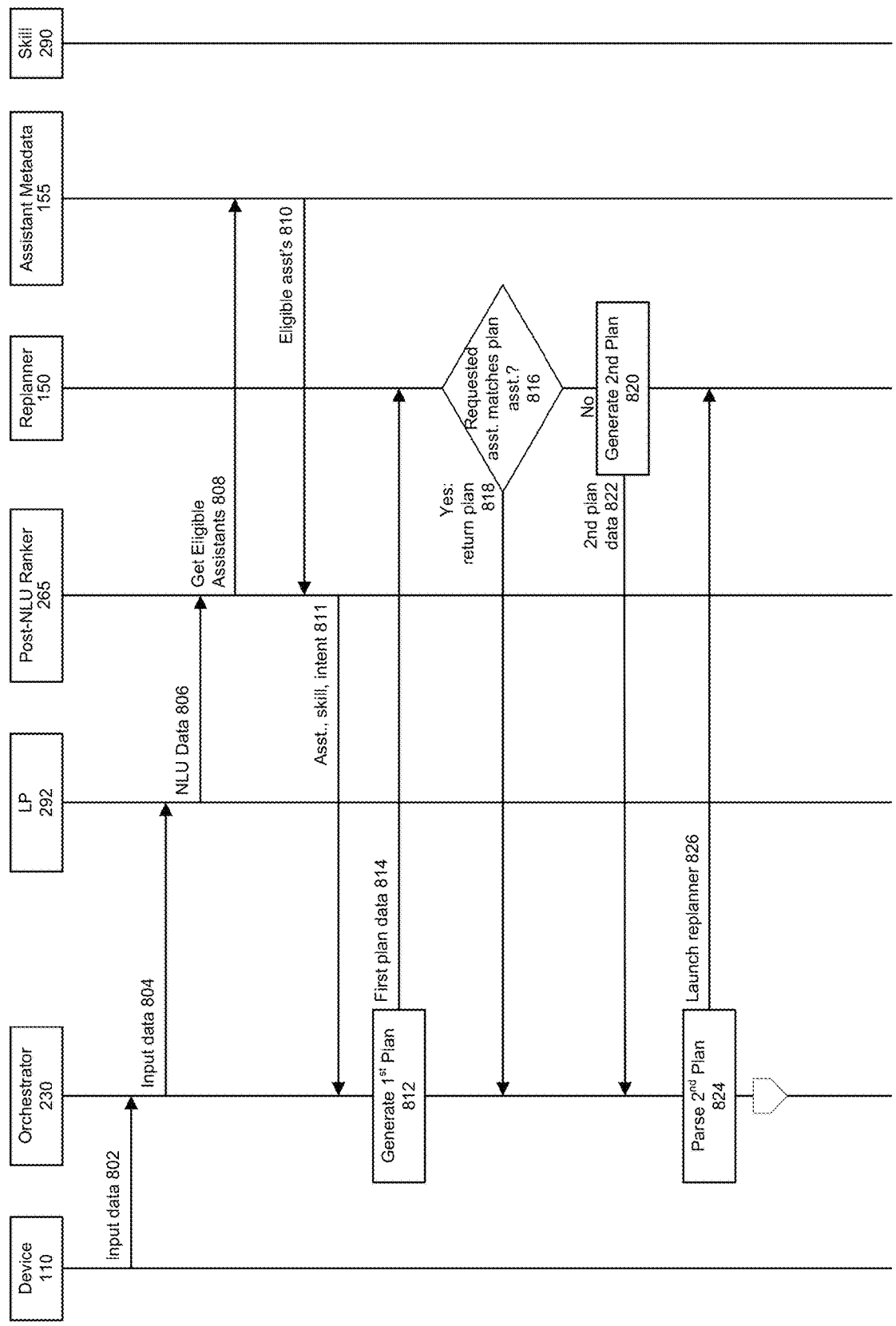
FIGS. 8A and 8B are signal flow diagrams further illustrating the second example operations of the virtual assistant system, according to embodiments of the present disclosure.
Figure 8B:
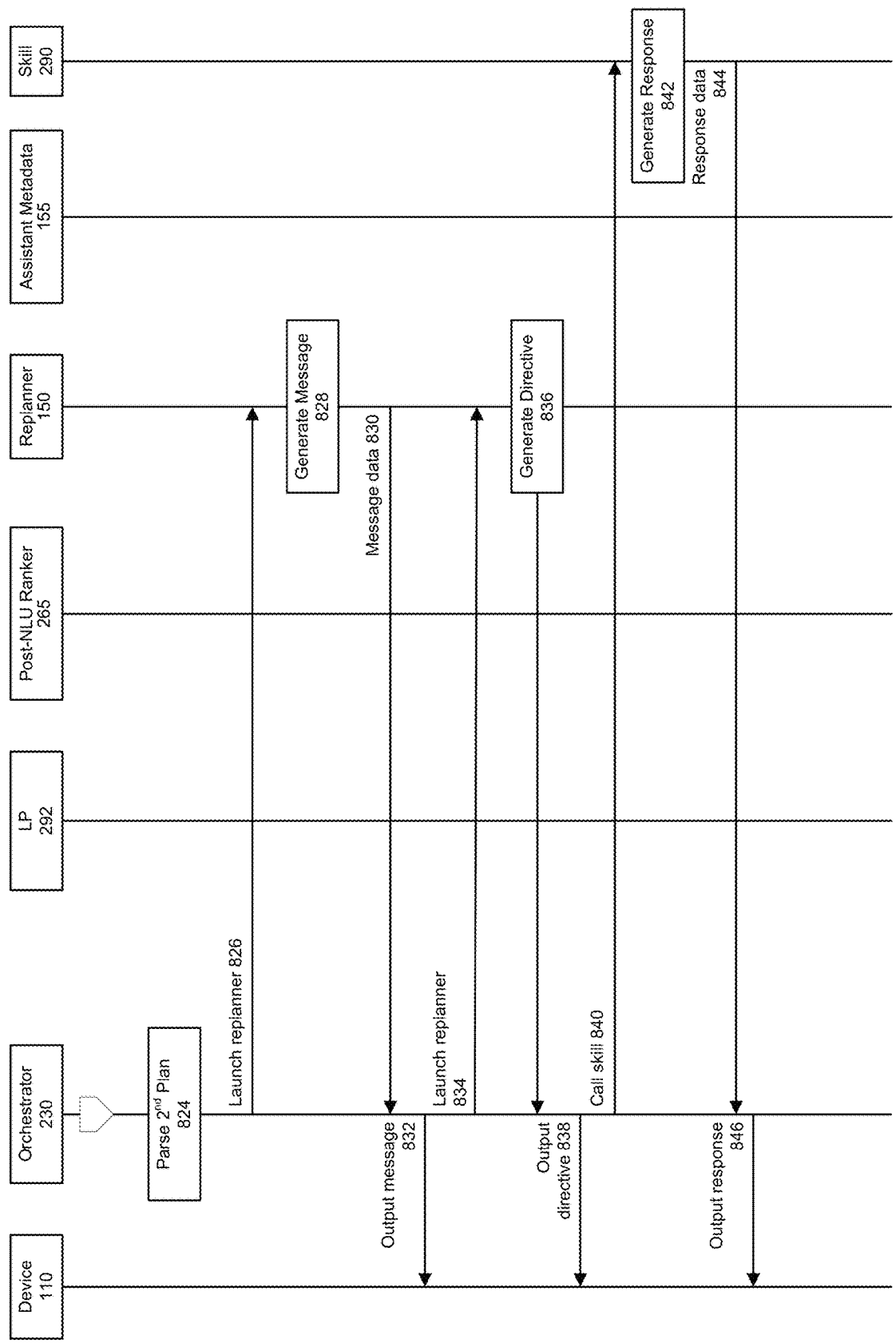

FIGS. 8A and 8B are signal flow diagram further illustrating the second example operations of the virtual assistant system, according to embodiments of the present disclosure. In the example operations shown in FIGS. 8A and 8B, the system 100 invokes a replanner component to generate plan data for handling a handover from a requested CPS to an active CPS, and executing a requested action. The diagram illustrates communications between the device 110, the orchestrator component 230, the profile storage component 270, the language processing component 292, the post-NLU ranker 265, the replanner component 150, the assistant metadata component 155, and a skill 290. Some operations may be omitted for clarity.

The device 110 may receive input representing, for example, a command: "Alexa, roll up the windows." In some cases the command may be accompanied by a gesture such as a press of the button rather than being preceded by the wakeword. In some cases, no wakeword or gesture will accompany the input data, and the device 110 may associate the command with the default assistant (or ignore the command altogether). The device 110 may transmit (802) data representing the input to the remote system 120. An orchestrator component 230 of the remote system 120 may forward (804) the data to the LP component 292. The LP component 292 may perform ASR and/or NLU processing on the data, and forward NLU result data (806) to the post-NLU ranker 265. The NLU result data may include one or more hypotheses including an intent and slot data. The post-NLU ranker 265 can perform operations such as determining a skill for performing the intent/slot combination, CPSs configured to handle commands that invoke the skill, filtering out invalid skill/intent/CPS combinations, and reranking the NLU result data. The post-NLU reranker 292 can call (808) the assistant metadata component 155 to obtain a list of one or more CPSs enabled for the device 110. The assistant metadata component 155 can return (810) the list of eligible CPSs to the post-NLU ranker 265, which can then determine which assistant/skill/intent combinations are valid based on the currently eligible CPSs. The post-NLU ranker 265 may rank the CPS/skill/intent combinations and return (811) the highest ranked combination to the orchestrator component 230. The orchestrator component 230 may generate (812) first plan data for handling the command represented by the input data. The first plan data may indicate the requested CPS (e.g., corresponding to the assistant indicated by received wakeword or gesture) along with the CPS/skill/intent combination from the post-NLU reranker 265. The orchestrator component 230 may send (814) the first plan data to the replanner component 150.

The replanner component 150 may process the first plan data to determine (816) whether the requested CPS matches the CPS identified in the CPS/skill/intent combination returned by the post-NLU ranker 265. If the requested CPS matches the CPS/skill/intent, the replanner component 150 may return (818) the first plan data to the orchestrator component 230 unmodified. If the requested CPS does not match the CPS/skill/intent, however, the replanner component 150 may generate (820) second plan data. The replanner component 150 may include one or more additional operations in the second plan data that inform the user that a handoff of responsibility from the requested CPS to the selected CPS will be performed or has been performed. In some implementations, the replanner component 150 will apply rules or process historical data stored in the assistant metadata component 155 and/or the profile storage 270. The replanner component 150 may determine a handoff type to use based on parameters of the first plan data and/or other context. The replanner component 150 may retrieve a template for the determined handoff type from the assistant metadata component 155 and use the template to generate the second plan data. The replanner component 150 may return (822) the second plan data to the orchestrator component 230. The orchestrator component 230 may parse (824) the second plan data to perform the operations therein.

Continuing to FIG. 8B, a first operation specified in the second plan data may instruct the orchestrator component 230 to launch (826) the replanner component 150 with a payload describing a message related to the handoff. The replanner component 150 may generate (828) the message for delivery to the user. In some implementations, the replanner component 150 may retrieve message data from the assistant metadata component 155. The replanner component 150 may return (830) the message data to the orchestrator component 230. The orchestrator component 230 may cause the output of the message via the device 110 by, for example, calling on the TTS component 280 to generate synthesized speech having a speech style consistent with the requested CPS. The orchestrator component 230 can cause (832) the device 110 to output the message by, for example, outputting synthesized speech: "Hmmm. Hal can handle that for you."

After outputting the message, the orchestrator component 230 may continue parsing the second plan data and perform additional operations. For example, the plan may specify an operation for sending a directive to the application 124 that changes the active assistant. The orchestrator 230 may launch (834) the replanner again with a payload that indicates that the active assistant for the device 110 is to change. The replanner component 150 may generate (836) a directive and return it to the orchestrator 230. The orchestrator 230 may output (838) the directive to the device 110. The device 110, upon receiving the directive, may update its state to reflect the active assistant for the purpose of maintaining an active dialog with the active assistant (that is, the active CPS 180 or 181). The device 110 may additionally provide indications of the active assistant in the form of sounds (earcons), displayed images (voice chromes), and or light color/patterns emitted from LEDs or other light sources of the device 110.

After outputting the message and directive to the device 110, the orchestrator component 230 can continue parsing the second plan data. A next operation described by the second plan data may instruct the orchestrator to call (840) the skill component 290 with a payload indicating that the skill component 290 should process intent and/or slot data based on an indication of the selected CPS. The skill component 290 may generate (842) an appropriate response, and return (844) the response data to the orchestrator component 230. The orchestrator component 230 may once again cause (846) the device 110 to output a response consistent with the response data by, for example, generating synthesized speech in a speech style associated with the selected CPS using the TTS component 280. The device 110 may output the response and/or perform an action as indicated in the response data by, for example, rolling up the window.

Figure 9:
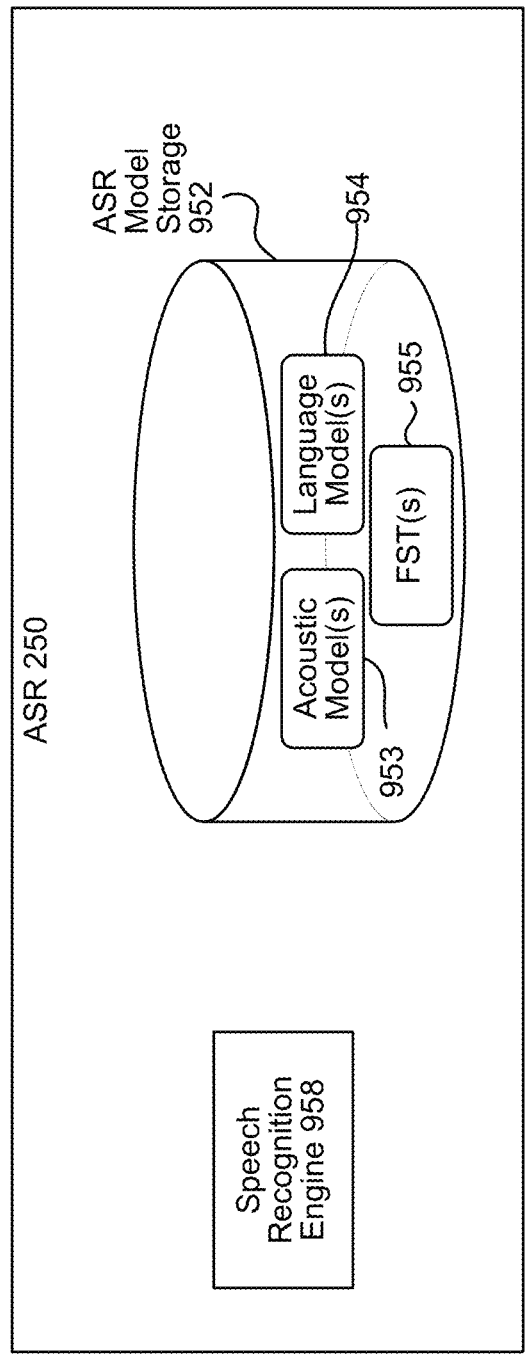
FIG. 9 is a conceptual diagram of an ASR component, according to embodiments of the present disclosure.

FIG. 9 is a conceptual diagram of an ASR component 250, according to embodiments of the present disclosure. The ASR component 250 may interpret a spoken natural language input based on the similarity between the spoken natural language input and pre-established language models 954 stored in an ASR model storage 952. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 955 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 953 stored in the ASR model storage 952), and the likelihood that a particular word, which matches the sounds, would be included in the sentence at the specific location (e.g., using a language or grammar model 954). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 958. The ASR component 250 receives audio data 211 (for example, received from a local device 110 having processed audio detected by a microphone by an acoustic front end (AFE) or other component). The speech recognition engine 958 compares the audio data 211 with acoustic models 953, language models 954, FST(s) 955, and/or other data models and information for recognizing the speech conveyed in the audio data. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the audio data 211 with reference to information stored in the ASR model storage 952. Feature vectors of the audio data 211 may arrive at the system 120 encoded, in which case they may be decoded prior to processing by the speech recognition engine 958.

The speech recognition engine 258 attempts to match received feature vectors to language acoustic units (e.g., phonemes) and words as known in the stored acoustic models 953, language models 2B54, and FST(s) 955. For example, audio data 211 may be processed by one or more acoustic model(s) 953 to determine acoustic unit data. The acoustic unit data may include indicators of acoustic units detected in the audio data 211 by the ASR component 250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 954 (and/or using FST 955) to determine ASR data 1110. The ASR data 1110 can include one or more hypotheses. One or more of the hypotheses represented in the ASR data 1110 may then be sent to further components (such as the NLU component 260) for further processing as discussed herein. The ASR data 1110 may include representations of text of an utterance, such as words, subword units, or the like.

The speech recognition engine 958 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 958 may use the acoustic model(s) 253 to attempt to match received audio feature vectors to words or subword acoustic units. An acoustic unit may be a senone, phoneme, phoneme in context, syllable, part of a syllable, syllable in context, or any other such portion of a word. The speech recognition engine 958 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 958 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 958, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 958 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

In some implementations, the ASR component 250 may load different and/or additional acoustic models 953, FSTs 955, and/or language models 954 depending on a context associated with the received audio data 211. For example, the ASR component 250 may load different models depending on a user, device, device type, etc., associated with the audio data 211. In some implementations, the ASR component 250 may load models associated with CPSs 180 and 181 eligible and/or available for handling commands received from the device 110. Leveraging CPS-specific models may improve the quality of ASR result data and/or reduce the computational load of ASR processing.

Figure 10:
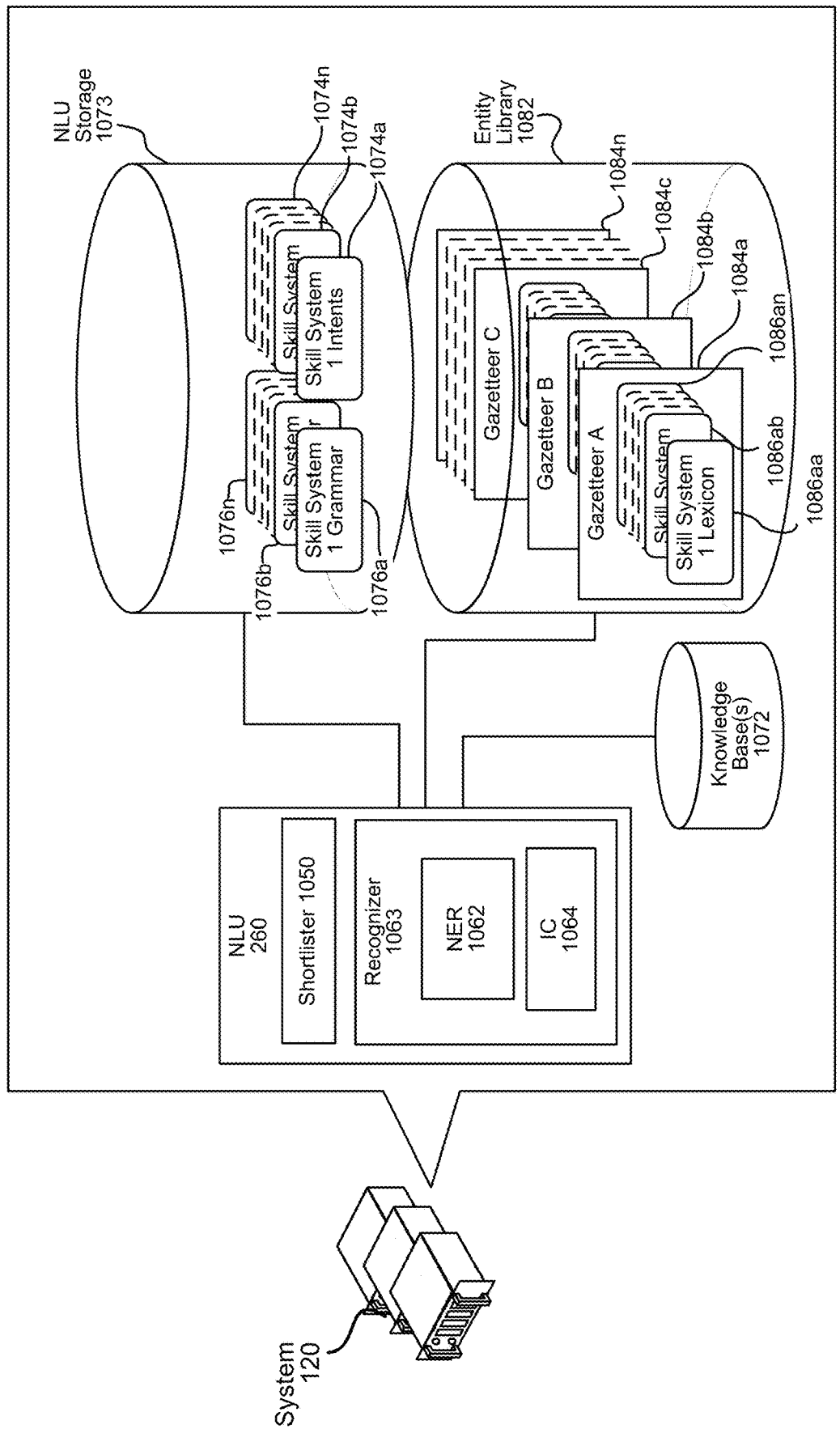
FIG. 10 is a conceptual diagram of how natural language processing is performed, according to embodiments of the present disclosure.
Figure 11:
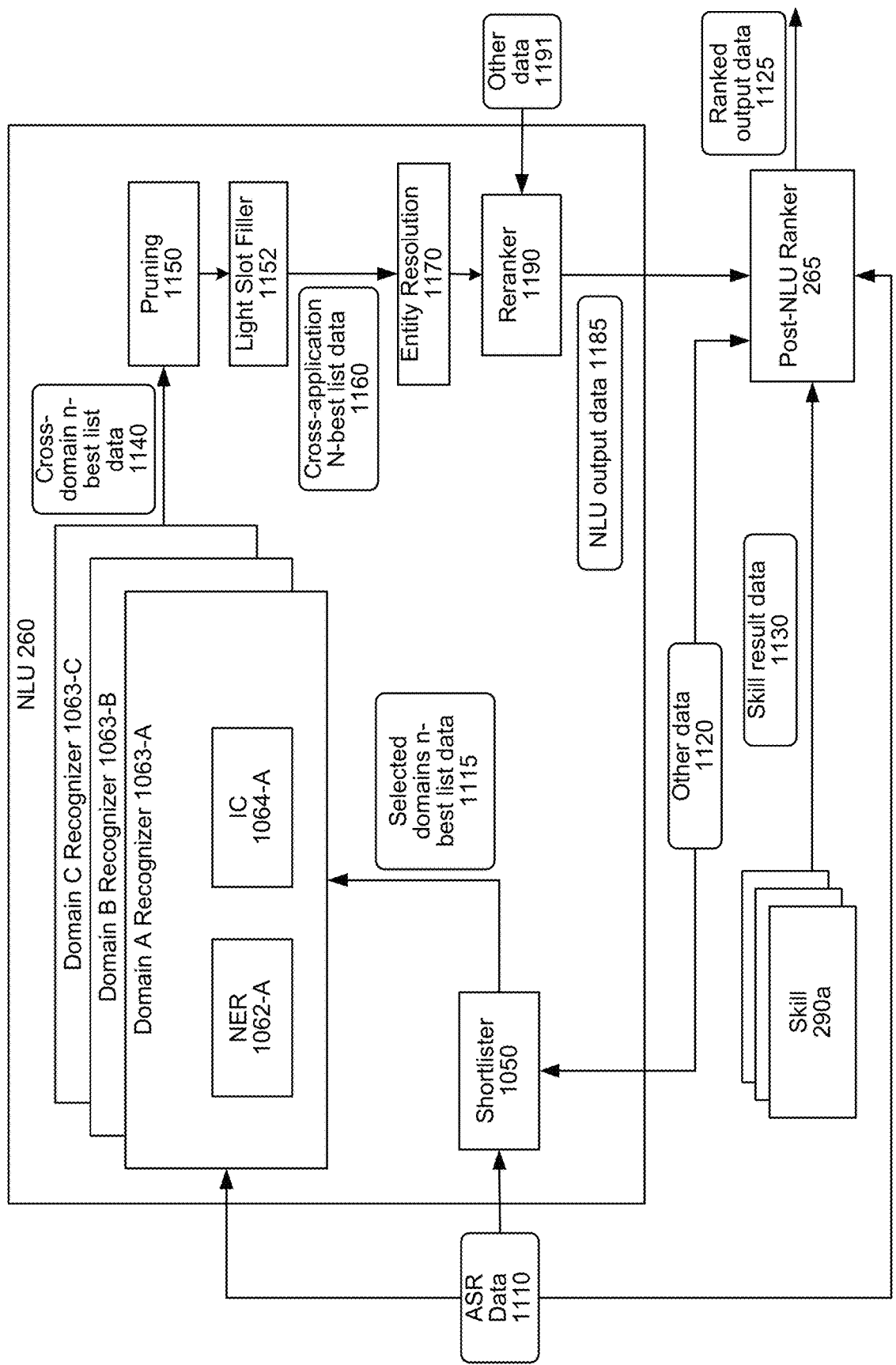
FIG. 11 is a conceptual diagram of how natural language processing is performed, according to embodiments of the present disclosure.

FIGS. 10 and 11 illustrates how the NLU component 260 may perform NLU processing. FIG. 10 is a conceptual diagram of how natural language processing is performed, according to embodiments of the present disclosure. And FIG. 11 is a conceptual diagram of how natural language processing is performed, according to embodiments of the present disclosure.

FIG. 10 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may leverage libraries of data related to intents, slot data, and/or entities. For example, the NLU component 260 may reference NLU storage 1071 and entity library 1082. The NLU storage 1073 may contain skill system grammars 1076 and skill system intents 1074. The entity library 1082 may include gazetteers 1084, each associated skill system lexicons 1086. The NLU component 260 may process ASR hypotheses based on the information in these various data. In some implementations, the NLU component 260 may add or remove portions of this various data depending on a list of CPSs 180 and 181 eligible and/or available for handling a given input. For example, different skill systems and/or intents may be relevant depending on which CPSs 180 and 181 are enabled for use with the device 110. Additionally or alternatively, a reranker or a post-NLU ranker (e.g., the reranker 1190 and/or post-NLU ranker 265 discussed below) may take into account CPS 180 or 181 information when ranking NLU hypotheses.

The NLU component 260 may include a shortlister component 1050. The shortlister component 1050 selects skills that may execute with respect to ASR output data 1110 input to the NLU component 260 (e.g., applications that may execute with respect to the user input). The ASR output data 1110 (which may also be referred to as ASR data 1110) may include representations of text of an utterance, such as words, subword units, or the like. The shortlister component 1050 thus limits downstream, more resource intensive NLU processes to being performed with respect to skills that may execute with respect to the user input.

Without a shortlister component 1050, the NLU component 260 may process ASR output data 1110 input thereto with respect to every skill of the system, either in parallel, in series, or using some combination thereof. By implementing a shortlister component 1050, the NLU component 260 may process ASR output data 1110 with respect to only the skills that may execute with respect to the user input. This reduces total compute power and latency attributed to NLU processing.

The shortlister component 1050 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 1050 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1050 may be trained with respect to a different skill. Alternatively, the shortlister component 1050 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 1050. For example, some sample user inputs may be positive examples (e.g., user inputs that may be used to invoke the skill). Other sample user inputs may be negative examples (e.g., user inputs that may not be used to invoke the skill).

As described above, the shortlister component 1050 may include a different trained model for each skill of the system, a different trained model for each domain, or some other combination of trained model(s). For example, the shortlister component 1050 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1050 to output indications of only a portion of the skills that the ASR output data 1110 may relate to. For example, a user input may correspond to "tell me about Tom Collins." If the model is clustered based on domain, the shortlister component 1050 may determine the user input corresponds to a recipe skill (e.g., a drink recipe) even though the user input may also correspond to an information skill (e.g., including information about a person named Tom Collins).

The NLU component 260 may include one or more recognizers 1063. In at least some embodiments, a recognizer 1063 may be associated with a skill system 125 (e.g., the recognizer may be configured to interpret text data to correspond to the skill system 125). In at least some other examples, a recognizer 1063 may be associated with a domain such as smart home, video, music, weather, custom, etc. (e.g., the recognizer may be configured to interpret text data to correspond to the domain).

If the shortlister component 1050 determines ASR output data 1110 is potentially associated with multiple domains, the recognizers 1063 associated with the domains may process the ASR output data 1110, while recognizers 1063 not indicated in the shortlister component 1050's output may not process the ASR output data 1110. The "shortlisted" recognizers 1063 may process the ASR output data 1110 in parallel, in series, partially in parallel, etc. For example, if ASR output data 1110 potentially relates to both a communications domain and a music domain, a recognizer associated with the communications domain may process the ASR output data 1110 in parallel, or partially in parallel, with a recognizer associated with the music domain processing the ASR output data 1110.

Each recognizer 1063 may include a named entity recognition (NER) component 1062. The NER component 1062 attempts to identify grammars and lexical information that may be used to construe meaning with respect to text data input therein. The NER component 1062 identifies portions of text data that correspond to a named entity associated with a domain, associated with the recognizer 1063 implementing the NER component 1062. The NER component 1062 (or other component of the NLU component 260) may also determine whether a word refers to an entity whose identity is not explicitly mentioned in the text data, for example "him," "her," "it" or other anaphora, exophora, or the like.

Each recognizer 1063, and more specifically each NER component 1062, may be associated with a particular grammar database 1076, a particular set of intents/actions 1074, and a particular personalized lexicon 1086. Each gazetteer 1084 may include domain/skill-indexed lexical information associated with a particular user and/or device 110. For example, a Gazetteer A (1084a) includes skill-indexed lexical information 1086aa to 1086an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1062 applies grammar information 1076 and lexical information 1086 associated with a domain (associated with the recognizer 1063 implementing the NER component 1062) to determine a mention of one or more entities in text data. In this manner, the NER component 1062 identifies "slots" (each corresponding to one or more particular words in text data) that may be useful for later processing. The NER component 1062 may also label each slot with a type (e.g., noun, place, city, artist name, song name, etc.).

Each grammar database 1076 includes the names of entities (i.e., nouns) commonly found in speech about the particular domain to which the grammar database 1076 relates, whereas the lexical information 1086 is personalized to the user and/or the device 110 from which the user input originated. For example, a grammar database 1076 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (1084a-1084n) stored in an entity library storage 1082. The gazetteer information 1084 may be used to match text data (representing a portion of the user input) with text data representing known entities, such as song titles, contact names, etc. Gazetteers 1084 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1063 may also include an intent classification (IC) component 1064. An IC component 1064 parses text data to determine an intent(s) (associated with the domain associated with the recognizer 1063 implementing the IC component 1064) that potentially represents the user input. An intent represents to an action a user desires be performed. An IC component 1064 may communicate with a database 1074 of words linked to intents. For example, a music intent database may link words and phrases such as "quiet," "volume off," and "mute" to a <Mute> intent. An IC component 1064 identifies potential intents by comparing words and phrases in text data (representing at least a portion of the user input) to the words and phrases in an intents database 1074 (associated with the domain that is associated with the recognizer 1063 implementing the IC component 1064).

The intents identifiable by a specific IC component 1064 are linked to domain-specific (i.e., the domain associated with the recognizer 1063 implementing the IC component 1064) grammar frameworks 1076 with "slots" to be filled. Each slot of a grammar framework 1076 corresponds to a portion of text data that the system believes corresponds to an entity. For example, a grammar framework 1076 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1076 may not be structured as sentences, but rather based on associating slots with grammatical tags.

For example, an NER component 1062 may parse text data to identify words as subject, object, verb, preposition, etc. based on grammar rules and/or models prior to recognizing named entities in the text data. An IC component 1064 (implemented by the same recognizer 1063 as the NER component 1062) may use the identified verb to identify an intent. The NER component 1062 may then determine a grammar model 1076 associated with the identified intent. For example, a grammar model 1076 for an intent corresponding to <PlayMusic> may specify a list of slots applicable to play the identified "object" and any object modifier (e.g., a prepositional phrase), such as {Artist Name}, {Album Name}, {Song name}, etc. The NER component 1062 may then search corresponding fields in a lexicon 1086 (associated with the domain associated with the recognizer 1063 implementing the NER component 1062), attempting to match words and phrases in text data the NER component 1062 previously tagged as a grammatical object or object modifier with those identified in the lexicon 1086.

An NER component 1062 may perform semantic tagging, which is the labeling of a word or combination of words according to their type/semantic meaning. An NER component 1062 may parse text data using heuristic grammar rules, or a model may be constructed using techniques such as Hidden Markov Models, maximum entropy models, log linear models, conditional random fields (CRF), and the like. For example, an NER component 1062 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1062 identifies "Play" as a verb based on a word database associated with the music domain, which an IC component 1064 (also implemented by the music domain recognizer) may determine corresponds to a <PlayMusic> intent. At this stage, no determination has been made as to the meaning of "mother's little helper" or "the rolling stones," but based on grammar rules and models, the NER component 1062 has determined the text of these phrases relates to the grammatical object (i.e., entity) of the user input represented in the text data.

An NER component 1062 may tag text data to attribute meaning thereto. For example, an NER component 1062 may tag "play mother's little helper by the rolling stones" as: {domain} Music, {intent}<PlayMusic>, {artist name} rolling stones, {media type} SONG, and {song title} mother's little helper. For further example, the NER component 1062 may tag "play songs by the rolling stones" as: {domain} Music, {intent}<PlayMusic>, {artist name} rolling stones, and {media type} SONG.

The shortlister component 1050 may receive ASR output data 1110 output from the ASR component 250 or output from the device 110b (as illustrated in FIG. 11). The ASR component 250 may embed the ASR output data 1110 into a form processable by a trained model(s) using sentence embedding techniques as known in the art. Sentence embedding results in the ASR output data 1110 including text in a structure that enables the trained models of the shortlister component 1150 to operate on the ASR output data 1110. For example, an embedding of the ASR output data 1110 may be a vector representation of the ASR output data 1110.

The shortlister component 1050 may make binary determinations (e.g., yes or no) regarding which domains relate to the ASR output data 1110. The shortlister component 1050 may make such determinations using the one or more trained models described herein above. If the shortlister component 1050 implements a single trained model for each domain, the shortlister component 1050 may simply run the models that are associated with enabled domains as indicated in a user profile associated with the device 110 and/or user that originated the user input.

The shortlister component 1050 may generate n-best list data 1115 representing domains that may execute with respect to the user input represented in the ASR output data 1110. The size of the n-best list represented in the n-best list data 1115 is configurable. In an example, the n-best list data 1115 may indicate every domain of the system as well as contain an indication, for each domain, regarding whether the domain is likely capable to execute the user input represented in the ASR output data 1110. In another example, instead of indicating every domain of the system, the n-best list data 1115 may only indicate the domains that are likely to be able to execute the user input represented in the ASR output data 1110. In yet another example, the shortlister component 1050 may implement thresholding such that the n-best list data 1115 may indicate no more than a maximum number of domains that may execute the user input represented in the ASR output data 1110. In an example, the threshold number of domains that may be represented in the n-best list data 1115 is ten. In another example, the domains included in the n-best list data 1115 may be limited by a threshold a score, where only domains indicating a likelihood to handle the user input is above a certain score (as determined by processing the ASR output data 1110 by the shortlister component 1050 relative to such domains) are included in the n-best list data 1115.

The ASR output data 1110 may correspond to more than one ASR hypothesis. When this occurs, the shortlister component 1050 may output a different n-best list (represented in the n-best list data 1115) for each ASR hypothesis. Alternatively, the shortlister component 1050 may output a single n-best list representing the domains that are related to the multiple ASR hypotheses represented in the ASR output data 1110.

As indicated above, the shortlister component 1050 may implement thresholding such that an n-best list output therefrom may include no more than a threshold number of entries. If the ASR output data 1110 includes more than one ASR hypothesis, the n-best list output by the shortlister component 1050 may include no more than a threshold number of entries irrespective of the number of ASR hypotheses output by the ASR component 250. Alternatively or in addition, the n-best list output by the shortlister component 1050 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 1110, the shortlister component 1050 may generate confidence scores representing likelihoods that domains relate to the ASR output data 1110. If the shortlister component 1050 implements a different trained model for each domain, the shortlister component 1050 may generate a different confidence score for each individual domain trained model that is run. If the shortlister component 1050 runs the models of every domain when ASR output data 1110 is received, the shortlister component 1050 may generate a different confidence score for each domain of the system. If the shortlister component 1050 runs the models of only the domains that are associated with skills indicated as enabled in a user profile associated with the device 110 and/or user that originated the user input, the shortlister component 1050 may only generate a different confidence score for each domain associated with at least one enabled skill. If the shortlister component 1050 implements a single trained model with domain specifically trained portions, the shortlister component 1050 may generate a different confidence score for each domain who's specifically trained portion is run. The shortlister component 1050 may perform matrix vector modification to obtain confidence scores for all domains of the system in a single instance of processing of the ASR output data 1110.

N-best list data 1115 including confidence scores that may be output by the shortlister component 1050 may be represented as, for example:

Search domain, 0.67
Recipe domain, 0.62
Information domain, 0.57
Shopping domain, 0.42

As indicated, the confidence scores output by the shortlister component 1050 may be numeric values. The confidence scores output by the shortlister component 1050 may alternatively be binned values (e.g., high, medium, low).

The n-best list may only include entries for domains having a confidence score satisfying (e.g., equaling or exceeding) a minimum threshold confidence score. Alternatively, the shortlister component 1050 may include entries for all domains associated with user enabled skills, even if one or more of the domains are associated with confidence scores that do not satisfy the minimum threshold confidence score.

The shortlister component 1050 may consider other data 1120 when determining which domains may relate to the user input represented in the ASR output data 1110 as well as respective confidence scores. The other data 1120 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1120 may include an indicator of the user associated with the ASR output data 1110, for example as determined by the user recognition component 295.

The other data 1120 may be character embedded prior to being input to the shortlister component 1050. The other data 1120 may alternatively be embedded using other techniques known in the art prior to being input to the shortlister component 1050.

The other data 1120 may also include data indicating the domains associated with skills that are enabled with respect to the device 110 and/or user that originated the user input. The shortlister component 1050 may use such data to determine which domain-specific trained models to run. That is, the shortlister component 1050 may determine to only run the trained models associated with domains that are associated with user-enabled skills. The shortlister component 1050 may alternatively use such data to alter confidence scores of domains.

As an example, considering two domains, a first domain associated with at least one enabled skill and a second domain not associated with any user-enabled skills of the user that originated the user input, the shortlister component 1050 may run a first model specific to the first domain as well as a second model specific to the second domain. Alternatively, the shortlister component 1050 may run a model configured to determine a score for each of the first and second domains. The shortlister component 1050 may determine a same confidence score for each of the first and second domains in the first instance. The shortlister component 1050 may then alter those confidence scores based on which domains is associated with at least one skill enabled by the present user. For example, the shortlister component 1050 may increase the confidence score associated with the domain associated with at least one enabled skill while leaving the confidence score associated with the other domain the same. Alternatively, the shortlister component 1050 may leave the confidence score associated with the domain associated with at least one enabled skill the same while decreasing the confidence score associated with the other domain. Moreover, the shortlister component 1050 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 1050 receives the ASR output data 1110, the shortlister component 1050 may determine whether profile data associated with the user and/or device 110 that originated the command includes an indication of enabled skills.

The other data 1120 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1050 may use such data to determine which domain-specific trained models to run. For example, if the device 110 corresponds to a displayless type device, the shortlister component 1050 may determine not to run trained models specific to domains that output video data. The shortlister component 1050 may alternatively use such data to alter confidence scores of domains.

As an example, considering two domains, one that outputs audio data and another that outputs video data, the shortlister component 1050 may run a first model specific to the domain that generates audio data as well as a second model specific to the domain that generates video data. Alternatively the shortlister component 1050 may run a model configured to determine a score for each domain. The shortlister component 1050 may determine a same confidence score for each of the domains in the first instance. The shortlister component 1050 may then alter the original confidence scores based on the type of the device 110 that originated the user input corresponding to the ASR output data 1110. For example, if the device 110 is a displayless device, the shortlister component 1050 may increase the confidence score associated with the domain that generates audio data while leaving the confidence score associated with the domain that generates video data the same. Alternatively, if the device 110 is a displayless device, the shortlister component 1050 may leave the confidence score associated with the domain that generates audio data the same while decreasing the confidence score associated with the domain that generates video data. Moreover, if the device 110 is a displayless device, the shortlister component 1050 may increase the confidence score associated with the domain that generates audio data as well as decrease the confidence score associated with the domain that generates video data.

The type of device information represented in the other data 1120 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1120 may represent the smart TV of other display device, and not the displayless device that captured the spoken user input.

The other data 1120 may also include data indicating the user input originating device's speed, location, or other mobility information. For example, the device may correspond to a vehicle including a display. If the vehicle is moving, the shortlister component 1050 may decrease the confidence score associated with a domain that generates video data as it may be undesirable to output video content to a user while the user is driving. The device may output data to the system(s) 120 indicating when the device is moving.

The other data 1120 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1050 may use such data to alter confidence scores of domains. For example, the shortlister component 1050 may run a first model specific to a first domain as well as a second model specific to a second domain. Alternatively, the shortlister component 1050 may run a model configured to determine a score for each domain. The shortlister component 1050 may also determine a same confidence score for each of the domains in the first instance. The shortlister component 1050 may then alter the original confidence scores based on the first domain being invoked to cause the system to output content while the current user input was received. Based on the first domain being invoked, the shortlister component 1050 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1115 generated by the shortlister component 1050 as well as the different types of other data 1120 considered by the shortlister component 1050 are configurable. For example, the shortlister component 1050 may update confidence scores as more other data 1120 is considered. For further example, the n-best list data 1115 may exclude relevant domains if thresholding is implemented. Thus, for example, the shortlister component 1050 may include an indication of a domain in the n-best list 1115 unless the shortlister component 1050 is one hundred percent confident that the domain may not execute the user input represented in the ASR output data 1110 (e.g., the shortlister component 1050 determines a confidence score of zero for the domain).

The shortlister component 1050 may send the ASR output data 1110 to recognizers 1063 associated with domains represented in the n-best list data 1115. Alternatively, the shortlister component 1050 may send the n-best list data 1115 or some other indicator of the selected subset of domains to another component (such as the orchestrator component 230) which may in turn send the ASR output data 1110 to the recognizers 1063 corresponding to the domains included in the n-best list data 1115 or otherwise indicated in the indicator. If the shortlister component 1050 generates an n-best list representing domains without any associated confidence scores, the shortlister component 1050/orchestrator component 230 may send the ASR output data 1110 to recognizers 1063 associated with domains that the shortlister component 1050 determines may execute the user input. If the shortlister component 1050 generates an n-best list representing domains with associated confidence scores, the shortlister component 1050/orchestrator component 230 may send the ASR output data 1110 to recognizers 1063 associated with domains associated with confidence scores satisfying (e.g., meeting or exceeding) a threshold minimum confidence score.

A recognizer 1063 may output tagged text data generated by an NER component 1062 and an IC component 1064, as described herein above. The NLU component 260 may compile the output tagged text data of the recognizers 1063 into a single cross-domain n-best list 1140 and may send the cross-domain n-best list 1140 to a pruning component 1150. Each entry of tagged text (e.g., each NLU hypothesis) represented in the cross-domain n-best list data 1140 may be associated with a respective score indicating a likelihood that the NLU hypothesis corresponds to the domain associated with the recognizer 1063 from which the NLU hypothesis was output. For example, the cross-domain n-best list data 1140 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1150 may sort the NLU hypotheses represented in the cross-domain n-best list data 1140 according to their respective scores. The pruning component 1150 may perform score thresholding with respect to the cross-domain NLU hypotheses. For example, the pruning component 1150 may select NLU hypotheses associated with scores satisfying (e.g., meeting and/or exceeding) a threshold score. The pruning component 1150 may also or alternatively perform number of NLU hypothesis thresholding. For example, the pruning component 1150 may select the top scoring NLU hypothesis(es). The pruning component 1150 may output a portion of the NLU hypotheses input thereto. The purpose of the pruning component 1150 is to create a reduced list of NLU hypotheses so that downstream, more resource intensive, processes may only operate on the NLU hypotheses that most likely represent the user's intent.

The NLU component 260 may include a light slot filler component 1152. The light slot filler component 1152 can take text from slots represented in the NLU hypotheses output by the pruning component 1150 and alter them to make the text more easily processed by downstream components. The light slot filler component 1152 may perform low latency operations that do not involve heavy operations such as reference to a knowledge base (e.g., 1072. The purpose of the light slot filler component 1152 is to replace words with other words or values that may be more easily understood by downstream components. For example, if a NLU hypothesis includes the word "tomorrow," the light slot filler component 1152 may replace the word "tomorrow" with an actual date for purposes of downstream processing. Similarly, the light slot filler component 1152 may replace the word "CD" with "album" or the words "compact disc." The replaced words are then included in the cross-domain n-best list data 1160.

The cross-domain n-best list data 1160 may be input to an entity resolution component 1170. The entity resolution component 1170 can apply rules or other instructions to standardize labels or tokens from previous stages into an intent/slot representation. The precise transformation may depend on the domain. For example, for a travel domain, the entity resolution component 1170 may transform text corresponding to "Boston airport" to the standard BOS three-letter code referring to the airport. The entity resolution component 1170 can refer to a knowledge base (e.g., 1072) that is used to specifically identify the precise entity referred to in each slot of each NLU hypothesis represented in the cross-domain n-best list data 1160. Specific intent/slot combinations may also be tied to a particular source, which may then be used to resolve the text. In the example "play songs by the stones," the entity resolution component 1170 may reference a personal music catalog, Amazon Music account, a user profile, or the like. The entity resolution component 1170 may output an altered n-best list that is based on the cross-domain n-best list 1160 but that includes more detailed information (e.g., entity IDs) about the specific entities mentioned in the slots and/or more detailed slot data that can eventually be used by a skill. The NLU component 260 may include multiple entity resolution components 1170 and each entity resolution component 1170 may be specific to one or more domains.

The NLU component 260 may include a reranker 1190. The reranker 1190 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1170.

The reranker 1190 may apply re-scoring, biasing, or other techniques. The reranker 1190 may consider not only the data output by the entity resolution component 1170, but may also consider other data 1191. The other data 1191 may include a variety of information. For example, the other data 1191 may include skill rating or popularity data. For example, if one skill has a high rating, the reranker 1190 may increase the score of a NLU hypothesis that may be processed by the skill. The other data 1191 may also include information about skills that have been enabled by the user that originated the user input. For example, the reranker 1190 may assign higher scores to NLU hypothesis that may be processed by enabled skills than NLU hypothesis that may be processed by non-enabled skills. The other data 1191 may also include data indicating user usage history, such as if the user that originated the user input regularly uses a particular skill or does so at particular times of day. The other data 1191 may additionally include data indicating date, time, location, weather, type of device 110, user identifier, context, as well as other information. For example, the reranker 1190 may consider when any particular skill is currently active (e.g., music being played, a game being played, etc.).

As illustrated and described, the entity resolution component 1170 is implemented prior to the reranker 1190. The entity resolution component 1170 may alternatively be implemented after the reranker 1190. Implementing the entity resolution component 1170 after the reranker 1190 limits the NLU hypotheses processed by the entity resolution component 1170 to only those hypotheses that successfully pass through the reranker 1190.

The reranker 1190 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2). The NLU component 260 may separately perform NLU processing described above with respect to domains associated with skills that are at least partially implemented as part of the skill system(s) 125. In an example, the shortlister component 1050 may only process with respect to these latter domains. Results of these two NLU processing paths may be merged into NLU output data 1185, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 1185, skill result data 1130, and the other data 1120 in order to output ranked output data 1125. The ranked output data 1125 may include an n-best list where the NLU hypotheses in the NLU results data 1185 are reordered such that the n-best list in the ranked output data 1125 represents a prioritized list of skills to respond to a user input as determined by the post-NLU ranker 265. The ranked output data 1125 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 1185 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 1130 based on the first NLU hypothesis and the second NLU hypothesis, respectively. For example, the post-NLU ranker 265 may send the first NLU hypothesis to the first skill 290a along with a request for the first skill 290a to at least partially execute with respect to the first NLU hypothesis. The post-NLU ranker 265 may also send the second NLU hypothesis to the second skill 290b along with a request for the second skill 290b to at least partially execute with respect to the second NLU hypothesis. The post-NLU ranker 265 receives, from the first skill 290a, first result data 1130a generated from the first skill 290a's execution with respect to the first NLU hypothesis. The post-NLU ranker 265 also receives, from the second skill 290b, second results data 1130b generated from the second skill 290b's execution with respect to the second NLU hypothesis.

The result data 1130 may include various portions. For example, the result data 1130 may include content (e.g., audio data, text data, and/or video data) to be output to a user. The result data 1130 may also include a unique identifier used by the system(s) 120 and/or the skill system(s) 125 to locate the data to be output to a user. The result data 1130 may also include an instruction. For example, if the user input corresponds to "turn on the light," the result data 1130 may include an instruction causing the system to turn on a light associated with a profile of the device (110a/110b) and/or user.

The post-NLU ranker 265 may consider the first result data 1130a and the second result data 1130b to alter the first confidence score and the second confidence score of the first NLU hypothesis and the second NLU hypothesis, respectively. That is, the post-NLU ranker 265 may generate a third confidence score based on the first result data 1130a and the first confidence score. The third confidence score may correspond to how likely the post-NLU ranker 265 determines the first skill will correctly respond to the user input. The post-NLU ranker 265 may also generate a fourth confidence score based on the second result data 1130b and the second confidence score. One skilled in the art will appreciate that a first difference between the third confidence score and the fourth confidence score may be greater than a second difference between the first confidence score and the second confidence score. The post-NLU ranker 265 may also consider the other data 1120 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 1130 associated with the skill 290 with the highest altered confidence score to be the data output in response to the current user input. The post-NLU ranker 265 may also consider the ASR output data 1110 to alter the NLU hypotheses confidence scores.

The orchestrator component 230 may, prior to sending the NLU results data 1185 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 1185, including NLU hypotheses paired with skills 290, to the post-NLU ranker 265. In response to ASR output data 1110 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU output data 1185, to provide result data 1130 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 1130. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 1130 indicating slots of a framework that the skill 290 further needs filled or entities that the skill 290 further needs resolved prior to the skill 290 being able to provided result data 1130 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 1130 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 1130 provided by the skills 290 to alter the NLU processing confidence scores generated by the reranker 1190. That is, the post-NLU ranker 265 uses the result data 1130 provided by the queried skills 290 to create larger differences between the NLU processing confidence scores generated by the reranker 1190. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 1130 responsive to NLU hypotheses over skills 290 that provide result data 1130 corresponding to an indication that further information is needed, as well as skills 290 that provide result data 1130 indicating they can provide multiple responses to received NLU hypotheses. For example, the post-NLU ranker 265 may generate a first score for a first skill 290a that is greater than the first skill's NLU confidence score based on the first skill 290a providing result data 1130a including a response to a NLU hypothesis. For further example, the post-NLU ranker 265 may generate a second score for a second skill 290b that is less than the second skill's NLU confidence score based on the second skill 290*b* providing result data 1130*b* indicating further information is needed for the second skill 290*b* to provide a response to a NLU hypothesis. Yet further, for example, the post-NLU ranker 265 may generate a third score for a third skill 290*c* that is less than the third skill's NLU confidence score based on the third skill 290*c* providing result data 1130*c* indicating the third skill 290*c* can provide multiple responses to a NLU hypothesis.

The post-NLU ranker 265 may consider other data 1120 in determining scores. The other data 1120 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290*a* that is greater than the first skill's NLU processing confidence score based on the first skill 290*a* being associated with a high ranking. For further example, the post-NLU ranker 265 may generate a second score for a second skill 290*b* that is less than the second skill's NLU processing confidence score based on the second skill 290*b* being associated with a low ranking.

The other data 1120 may include information indicating whether or not the user that originated the user input has enabled one or more of the queried skills 290. For example, the post-NLU ranker 265 may generate a first score for a first skill 290*a* that is greater than the first skill's NLU processing confidence score based on the first skill 290*a* being enabled by the user that originated the user input. For further example, the post-NLU ranker 265 may generate a second score for a second skill 290*b* that is less than the second skill's NLU processing confidence score based on the second skill 290*b* not being enabled by the user that originated the user input. When the post-NLU ranker 265 receives the NLU results data 1185, the post-NLU ranker 265 may determine whether profile data, associated with the user and/or device that originated the user input, includes indications of enabled skills.

The other data 1120 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 1120 may include information indicating the veracity of the result data 1130 provided by a skill 290. For example, if a user says "tell me a recipe for pasta sauce," a first skill 290*a* may provide the post-NLU ranker 265 with first result data 1130*a* corresponding to a first recipe associated with a five star rating and a second skill 290*b* may provide the post-NLU ranker 265 with second result data 1130*b* corresponding to a second recipe associated with a one star rating. In this situation, the post-NLU ranker 265 may increase the NLU processing confidence score associated with the first skill 290*a* based on the first skill 290*a* providing the first result data 1130*a* associated with the five star rating and/or decrease the NLU processing confidence score associated with the second skill 290*b* based on the second skill 290*b* providing the second result data 1130*b* associated with the one star rating.

The other data 1120 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290*a* corresponding to a room service skill associated with the hotel and/or decrease the NLU processing confidence score associated with a second skill 290*b* corresponding to a food skill not associated with the hotel.

The other data 1120 may include information indicating a location of the device and/or user that originated the user input. The system may be configured with skills 290 that may only operate with respect to certain geographic locations. For example, a user may provide a user input corresponding to "when is the next train to Portland." A first skill 290*a* may operate with respect to trains that arrive at, depart from, and pass through Portland, Oreg. A second skill 290*b* may operate with respect to trains that arrive at, depart from, and pass through Portland, Me. If the device and/or user that originated the user input is located in Seattle, Wash., the post-NLU ranker 265 may increase the NLU processing confidence score associated with the first skill 290*a* and/or decrease the NLU processing confidence score associated with the second skill 290*b*. Likewise, if the device and/or user that originated the user input is located in Boston, Mass., the post-NLU ranker 265 may increase the NLU processing confidence score associated with the second skill 290*b* and/or decrease the NLU processing confidence score associated with the first skill 290*a*.

The other data 1120 may include information indicating a time of day. The system may be configured with skills 290 that operate with respect to certain times of day. For example, a user may provide a user input corresponding to "order me food." A first skill 290*a* may generate first result data 1130*a* corresponding to breakfast. A second skill 290*b* may generate second result data 1130*b* corresponding to dinner. If the system(s) 120 receives the user input in the morning, the post-NLU ranker 265 may increase the NLU processing confidence score associated with the first skill 290*a* and/or decrease the NLU processing score associated with the second skill 290*b*. If the system(s) 120 receives the user input in the afternoon or evening, the post-NLU ranker 265 may increase the NLU processing confidence score associated with the second skill 290*b* and/or decrease the NLU processing confidence score associated with the first skill 290*a*.

The other data 1120 may include information indicating user preferences. The system may include multiple skills 290 configured to execute in substantially the same manner. For example, a first skill 290*a* and a second skill 290*b* may both be configured to order food from respective restaurants. The system may store a user preference (e.g., in the profile storage 270) that is associated with the user that provided the user input to the system(s) 120 as well as indicates the user prefers the first skill 290*a* over the second skill 290*b*. Thus, when the user provides a user input that may be executed by both the first skill 290*a* and the second skill 290*b*, the post-NLU ranker 265 may increase the NLU processing confidence score associated with the first skill 290*a* and/or decrease the NLU processing confidence score associated with the second skill 290*b*.

The other data 1120 may include information indicating system usage history associated with the user that originated the user input. For example, the system usage history may indicate the user originates user inputs that invoke a first skill 290*a* more often than the user originates user inputs that invoke a second skill 290*b*. Based on this, if the present user input may be executed by both the first skill 290*a* and the second skill 290*b*, the post-NLU ranker 265 may increase the NLU processing confidence score associated with the first skill 290*a* and/or decrease the NLU processing confidence score associated with the second skill 290*b*.

The other data 1120 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290*a* that generates audio data. The post-NLU ranker 265 may also or alternatively decrease the NLU processing confidence score associated with a second skill 290*b* that generates image data or video data.

The other data 1120 may include information indicating how long it took a skill 290 to provide result data 1130 to the post-NLU ranker 265. When the post-NLU ranker 265 multiple skills 290 for result data 1130, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 1120 to increase and decrease NLU processing confidence scores associated with various skills 290 that the post-NLU ranker 265 has already requested result data from. Alternatively, the post-NLU ranker 265 may use the other data 1120 to determine which skills 290 to request result data from. For example, the post-NLU ranker 265 may use the other data 1120 to increase and/or decrease NLU processing confidence scores associated with skills 290 associated with the NLU results data 1185 output by the NLU component 260. The post-NLU ranker 265 may select n-number of top scoring altered NLU processing confidence scores. The post-NLU ranker 265 may then request result data 1130 from only the skills 290 associated with the selected n-number of NLU processing confidence scores.

As described, the post-NLU ranker 265 may request result data 1130 from all skills 290 associated with the NLU results data 1185 output by the NLU component 260. Alternatively, the system(s) 120 may prefer result data 1130 from skills implemented entirely by the system(s) 120 rather than skills at least partially implemented by the skill system(s) 125. Therefore, in the first instance, the post-NLU ranker 265 may request result data 1130 from only skills associated with the NLU results data 1185 and entirely implemented by the system(s) 120. The post-NLU ranker 265 may only request result data 1130 from skills associated with the NLU results data 1185, and at least partially implemented by the skill system(s) 125, if none of the skills, wholly implemented by the system(s) 120, provide the post-NLU ranker 265 with result data 1130 indicating either data response to the NLU results data 1185, an indication that the skill can execute the user input, or an indication that further information is needed.

As indicated above, the post-NLU ranker 265 may request result data 1130 from multiple skills 290. If one of the skills 290 provides result data 1130 indicating a response to a NLU hypothesis and the other skills provide result data 1130 indicating either they cannot execute or they need further information, the post-NLU ranker 265 may select the result data 1130 including the response to the NLU hypothesis as the data to be output to the user. If more than one of the skills 290 provides result data 1130 indicating responses to NLU hypotheses, the post-NLU ranker 265 may consider the other data 1120 to generate altered NLU processing confidence scores, and select the result data 1130 of the skill associated with the greatest score as the data to be output to the user.

A system that does not implement the post-NLU ranker 265 may select the highest scored NLU hypothesis in the NLU results data 1185. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 1185 to provide result data 1130 to the post-NLU ranker 265 prior to the post-NLU ranker 265 ultimately determining the skill 290 to be invoked to respond to the user input. Some of the skills 290 may provide result data 1130 indicating responses to NLU hypotheses while other skills 290 may providing result data 1130 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 1130, associated with the skill 290 associated with the highest score, for output to the user. Alternatively, the post-NLU ranker 265 may output ranked output data 1125 indicating skills 290 and their respective post-NLU ranker rankings. Since the post-NLU ranker 265 receives result data 1130, potentially corresponding to a response to the user input, from the skills 290 prior to post-NLU ranker 265 selecting one of the skills or outputting the ranked output data 1125, little to no latency occurs from the time skills provide result data 1130 and the time the system outputs responds to the user.

If the post-NLU ranker 265 selects result audio data to be output to a user and the system determines content should be output audibly, the post-NLU ranker 265 (or another component of the system(s) 120) may cause the device 110*a* and/or the device 110*b* to output audio corresponding to the result audio data. If the post-NLU ranker 265 selects result text data to output to a user and the system determines content should be output visually, the post-NLU ranker 265 (or another component of the system(s) 120) may cause the device 110*b* to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110*b* to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110*a* and/or the device 110*b* to output audio corresponding to the output audio data.

As described, a skill 290 may provide result data 1130 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 1130 indicating a response to the user input, the post-NLU ranker 265 (or another component of the system(s) 120, such as the orchestrator component 230) may simply cause content corresponding to the result data 1130 to be output to the user. For example, the post-NLU ranker 265 may send the result data 1130 to the orchestrator component 230. The orchestrator component 230 may cause the result data 1130 to be sent to the device (110*a*/110*b*), which may output audio and/or display text corresponding to the result data 1130. The orchestrator component 230 may send the result data 1130 to the ASR component 250 to generate output text data and/or may send the result data 1130 to the TTS component 280 to generate output audio data, depending on the situation.

The skill 290 associated with the highest post-NLU ranker score may provide the post-NLU ranker 265 with result data 1130 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 265 may simply cause the received instruction data be output by the device (110*a*/110*b*). Alternatively, the instruction data may be in a format that is not capable of being output by the device (110*a*/110*b*). When this occurs, the post-NLU ranker 265 may cause the ASR component 250 or the TTS component 280 to process the instruction data, depending on the situation, to generate instruction data that may be output by the device (110*a*/110*b*). Once the user provides the system with all further information needed by the skill 290, the skill 290 may provide the system with result data 1130 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 1130 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 1130, the system may further engage a transactional skill 290 after the transactional skill 290 provides the post-NLU ranker 265 with result data 1130 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 12:
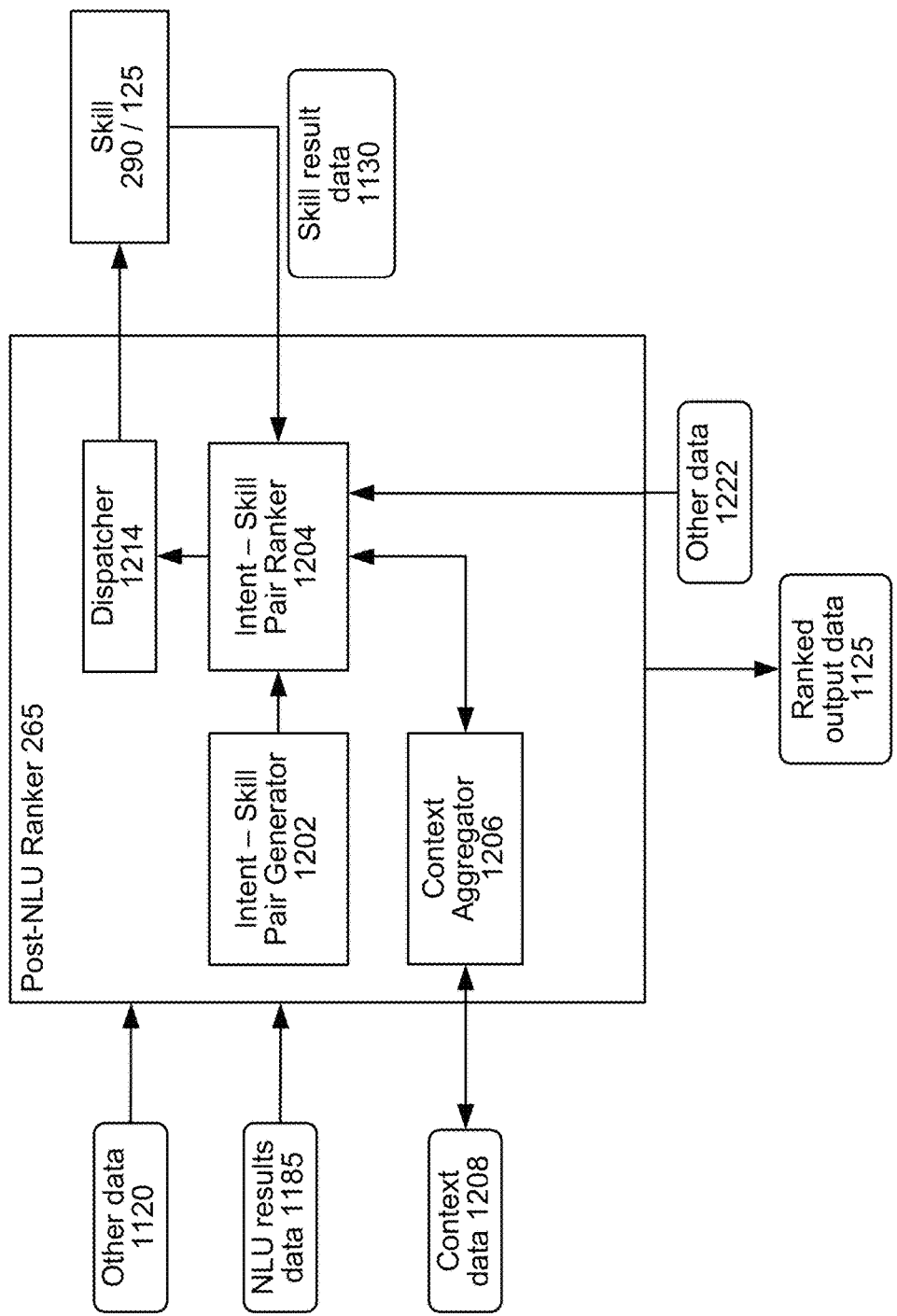
FIG. 12 is a conceptual diagram illustrating how a post-NLU ranker may process according to embodiments of the present disclosure.

FIG. 12 illustrates other configurations and operations of the post-NLU ranker 265. When the post-NLU ranker 265 receives NLU results data 1185, the NLU results data 1185 may be sent to an intent-skill pair generator 1202. The intent-skill pair generator 1202 may include information about what skills are capable of handling what intents. Such information may be context agnostic, and may thus indicate what skills are capable of handling what intents generally, without regard to the context associated with the user input. The intent-skill pair generator 1202 thus receives the NLU results data 1185 and identifies what particular candidate skills may handle the intent for NLU hypothesis. For example, if a NLU hypothesis includes a particular intent, the intent-skill pair generator 1202 identifies each skill that may execute with respect to the intent. For further example, if the NLU results data 1185 include multiple NLU hypotheses including multiple intents, the intent-skill pair generator 1202 associates each different NLU hypothesis with each skill that may execute with respect to the NLU hypothesis. As illustrated, the intent-skill pair generator 1202 may be implemented at part of the post-NLU ranker 265. However, one skill in the art will appreciate that the intent-skill pair generator 1202 may be implemented as part of the NLU component 260 or in another component without departing from the present disclosure. In such a case, the NLU results data 1185 may include intent-skill pairs.

The post-NLU ranker 265 may also include an intent-skill pair ranker 1204. The intent-skill pair ranker 1204 ranks the intent-skill pairs generated by the intent-skill pair generator 1202 based on, for example, the number of filled slots of a NLU hypothesis, an NLU confidence score associated with a NLU hypothesis, context information output by a context aggregator 1206, and/or other data.

The post-NLU ranker 265 may include the context aggregator 1206. The context aggregator 1206 receives context data 1208 from various contextual sources. The context data 1208 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 1206 may aggregate the context data 1208 and put the context data 1208 in a form that can be processed by the intent-skill pair ranker 1204. Context data 1208 may include data obtained from the device 110 or from other services connected to the system(s) 120.

The context data 1208 may include skill availability data. Such information may indicate what skills are available and authorized to process the user input. For example, if the user has only enabled certain skills, the enabled skills may be noted in the skill availability data.

The context data 1208 may also include dialogue data. A "dialogue" or "dialogue session" as used herein may refer to data transmissions (such as relating to multiple user inputs and system(s) 120 outputs) between the system(s) 120 and a local device (e.g., the device 110) that all relate to a single originating user input. Thus, the data transmissions of a dialogue session may share a dialogue identifier or other unique identifier that may be used by the orchestrator component 230, skill(s) 290, skill server(s) 125, etc. to track information across the dialogue session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or device 110 associated with the present user input). Dialogue data may also include content focus information (e.g., representing a skill that is streaming data to the device 110 when the data corresponding to the current user input is received by the system(s) 120). The context data 1208 may be one portion of the data used by the intent-skill pair ranker 1204 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 1208 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 1208 (and/or other data 1222) may include a metadata flag/indicator that represents whether the particular skill being executed is one that can handle a go-back (or other navigational) request.

The context data 1208 may also include user profile data. The user profile data may represent preferences and/or characteristics of the user that originated the current user input. Such data may be received from the profile storage 270.

The context data 1208 may also include location data. The location data may represent a location of the device 110 from which the user input was received.

The context data 1208 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

For example, while interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Beethoven's $5^{th}$ Symphony" the user may ask the system "when did he write that?" In order to answer the second query, the system must understand that "he" refers to Beethoven and "that" refers to the musical work $5^{th}$ Symphony. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

The context data 1208 may also include data regarding whether one or more skills are "in focus." A skill may be in interactive focus, meaning the skill was the most recent skill that executed a user input for a user or device associated with a present user input and/or the skill may be involved with an open dialogue (e.g., series of user inputs and responses) with a user device. Interactive focus attempts to continue a conversation between a user and the system and/or a skill for purposes of processing the dialogue. However, there may be instances where a user inputs a command that may be handled by a skill that is currently in interactive focus, but which the user does not intend to be executed by such skill. The system may process the context data 1208 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 1208 may also include other context data not explicitly recited herein.

The intent-skill pair ranker 1204 may operate one or more trained models that are configured to process the NLU results data 1185, skill result data 1130, and other data 1222 in order to determine a single best skill for executing the current user input from the available pairs output by the intent-skill pair generator 1202. The intent-skill pair ranker 1204 may send queries to the skills and request a first skill and a second skill (for example the candidate skills identified by the pair generator 1202), to provide potential result data indicating whether the skill can handle the intent at the particular moment and if so, what the output data for the particular skill would be (e.g., data the skill would provide to a user if the skill were selected to execute the user input) based on the NLU results data 1185. For example, the intent-skill pair ranker 1204 may send a first NLU hypothesis, associated with a first skill, to the first skill along with a request for the first skill to at least partially execute with respect to the first NLU hypothesis. The intent-skill pair ranker 1204 may also send a second NLU hypothesis, associated with the second skill, to the second skill along with a request for the second skill to at least partially execute with respect to the second NLU hypothesis. The intent-skill pair ranker 1204 receives, from the first skill, first result data 1130a generated from the first skill's execution with respect to the first NLU hypothesis. The intent-skill pair ranker 1204 also receives, from the second skill, second results data 1130b generated from the second skill's execution with respect to the second NLU hypothesis. Based on the first results data 1130a, a first NLU confidence score associated with the first NLU hypothesis, the second results data 1130b, a second NLU confidence score associated with the second NLU hypothesis, and other data 1222 (e.g., context data, user profile data, etc.), the intent-skill pair ranker 1204 determines the best skill for executing the current user input. The intent-skill pair ranker 1204 sends an indication of the best skill to a dispatcher component 1214.

The dispatcher 1214 may then send the selected skill the information needed to execute the user input, including an indication of the intent, the appropriate context data 1208 (such as device identifier, user identifier, or the like), slot data, utterance identifier, dialogue identifier, or any other information needed.

One or more models implemented by components of the orchestrator component 230, post-NLU ranker 265, shortlister 1050, or other component may be trained and operated according to various machine learning techniques.

The device 110 and/or the system(s) 120 may include a user recognition component 295 that recognizes one or more users using a variety of data. As illustrated in FIG. 13, the user recognition component 295 may include one or more subcomponents including a vision component 1308, an audio component 1310, a biometric component 1312, a radio frequency (RF) component 1314, a machine learning (ML) component 1316, and a recognition confidence component 1318. In some instances, the user recognition component 295 may monitor data and determinations from one or more subcomponents to determine an identity of one or more users associated with data input to the device 110 and/or the system(s) 120. The user recognition component 295 may output user recognition data 1395, which may include a user identifier associated with a user the user recognition component 295 determines originated data input to the device 110 and/or the system(s) 120. The user recognition data 1395 may be used to inform processes performed by various components of the device 110 and/or the system(s) 120.

The vision component 1308 may receive data from one or more sensors capable of providing images (e.g., cameras) or sensors indicating motion (e.g., motion sensors). The vision component 1308 can perform facial recognition or image analysis to determine an identity of a user and to associate that identity with a user profile associated with the user. In some instances, when a user is facing a camera, the vision component 1308 may perform facial recognition and identify the user with a high degree of confidence. In other instances, the vision component 1308 may have a low degree of confidence of an identity of a user, and the user recognition component 295 may utilize determinations from additional components to determine an identity of a user. The vision component 1308 can be used in conjunction with other components to determine an identity of a user. For example, the user recognition component 295 may use data from the vision component 1308 with data from the audio component 1310 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 1312. For example, the biometric component 1312 may receive data corresponding to fingerprints, iris or retina scans, thermal scans, weights of users, a size of a user, pressure (e.g., within floor sensors), etc., and may determine a biometric profile corresponding to a user. The biometric component 1312 may distinguish between a user and sound from a television, for example. Thus, the biometric component 1312 may incorporate biometric information into a confidence level for determining an identity of a user. Biometric information output by the biometric component 1312 can be associated with specific user profile data such that the biometric information uniquely identifies a user profile of a user.

The radio frequency (RF) component 1314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1314 the strength of the signal (e.g., as a received signal strength indication (RSSI)). The RF component 1314 may use the RSSI to determine an identity of a user (with an associated confidence level). In some instances, the RF component 1314 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1316 may track the behavior of various users as a factor in determining a confidence level of the identity of the user. By way of example, a user may adhere to a regular schedule such that the user is at a first location during the day (e.g., at work or at school). In this example, the ML component 1316 would factor in past behavior and/or trends in determining the identity of the user that provided input to the device 110 and/or the system(s) 120. Thus, the ML component 1316 may use historical data and/or usage patterns over time to increase or decrease a confidence level of an identity of a user.

In at least some instances, the recognition confidence component 1318 receives determinations from the various components 1308, 1310, 1312, 1314, and 1316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1395.

The audio component 1310 may receive data from one or more sensors capable of providing an audio signal (e.g., one or more microphones) to facilitate recognition of a user. The audio component 1310 may perform audio recognition on an audio signal to determine an identity of the user and associated user identifier. In some instances, aspects of device 110 and/or the system(s) 120 may be configured at a computing device (e.g., a local server). Thus, in some instances, the audio component 1310 operating on a computing device may analyze all sound to facilitate recognition of a user. In some instances, the audio component 1310 may perform voice recognition to determine an identity of a user.

The audio component 1310 may also perform user identification based on audio data 211 input into the device 110 and/or the system(s) 120 for speech processing. The audio component 1310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 1310 may perform user recognition by comparing speech characteristics represented in the audio data 211 to stored speech characteristics of users (e.g., stored voice profiles associated with the device 110 that captured the spoken user input).

Figure 14:
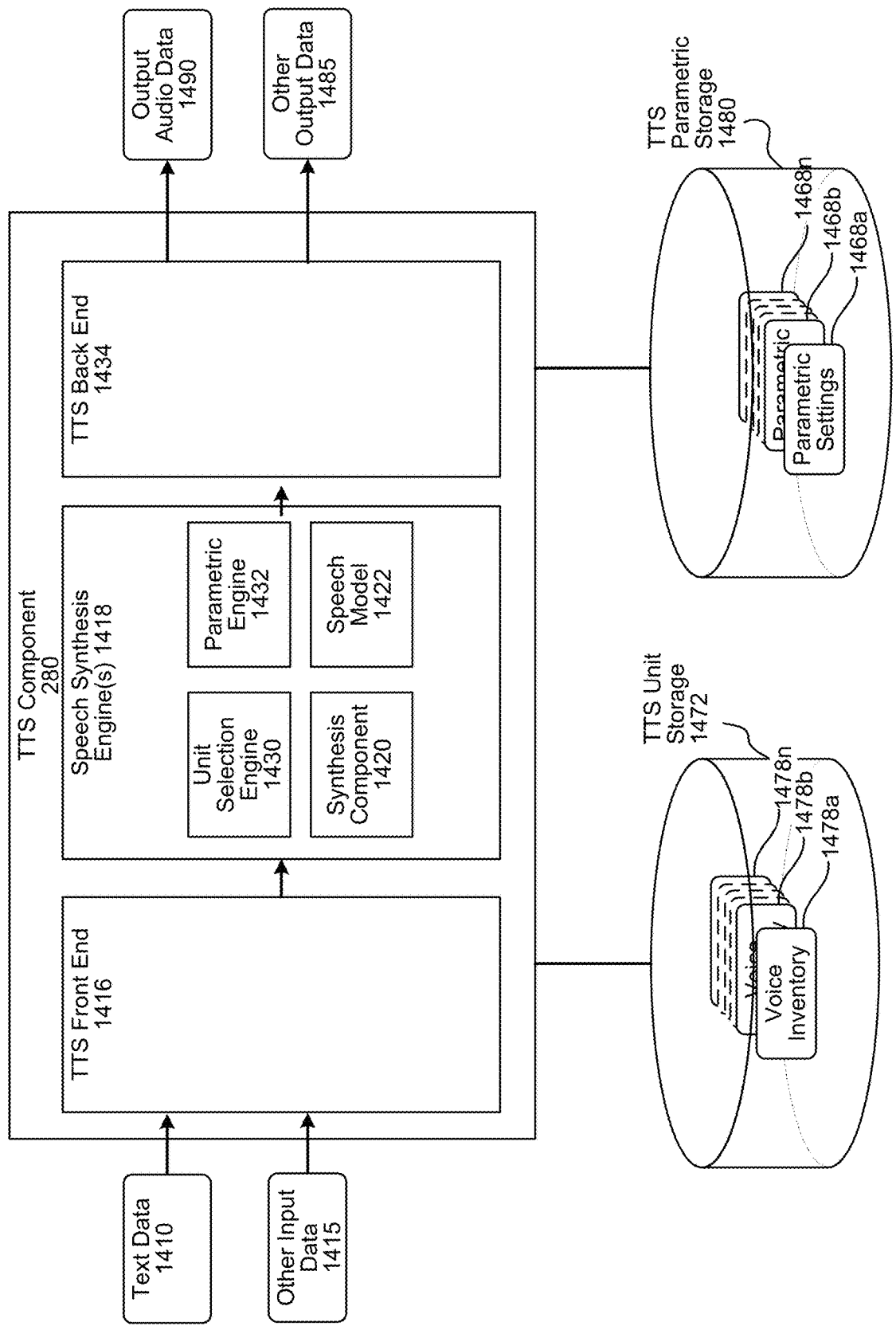
FIG. 14 is a conceptual diagram of text-to-speech components according to embodiments of the present disclosure.

Components of a system that may be used to perform unit selection, parametric TTS processing, and/or model-based audio synthesis are shown in FIG. 14. As shown in FIG. 14, the TTS component/processor 280 may include a TTS front end 1416, a speech synthesis engine 1418, TTS unit storage 1472, TTS parametric storage 1480, and a TTS back end 1434. The TTS unit storage 1472 may include, among other things, voice inventories 1478a-1478n that may include pre-recorded audio segments (called units) to be used by the unit selection engine 1430 when performing unit selection synthesis as described below. The TTS parametric storage 1480 may include, among other things, parametric settings 1468a-1468n that may be used by the parametric synthesis engine 1432 when performing parametric synthesis as described below. A particular set of parametric settings 1468 may correspond to a particular voice profile (e.g., whispered speech, excited speech, etc.).

In some embodiments, the system 120 may leverage the voice inventories 1478 and/or parametric settings 1468 to provide different assistants with different personalities as reflected in respective speech styles. For example, a first assistant (e.g., the first CPS 180) could be associated with a first voice inventory 1478a and first parametric settings 1468a, and a second assistant (e.g., the second CPS 181) could be associated with a second voice inventory 1478b and second parametric settings 1468b. Thus, the system 100 call the TTS component 280 for synthesized speech generation based on a particular assistant, and the TTS component 280 may return synthesized speech in a speech style indicative of that assistant. The user will thus be able to tell with which assistant he or she is interacting with at a given time based on the speech style of the synthetic voice alone. A change in the speech style of the synthetic voice can indicate to the user that a handoff from one assistant to another will or has occurred.

For example, the system 100 may receive a command with an indication that the requested assistant to handle the command corresponds to the first CPS 180. The system 100 may, however, select the second CPS 181 as better able to handle the command. The system 100 may call the TTS component 280 to generate a first message as the first assistant to indicate that the command will be handled by the second assistant. The TTS component 280 may thus return a handoff message in a first speech style corresponding to the first CPS 180. The system may then call the TTS component 280 to generate a second message as the second assistant to convey a result corresponding to the command. The TTS component 280 may thus return a response message in a second speech style corresponding to the second CPS 181.

In various embodiments of the present disclosure, model-based synthesis of audio data may be performed using by a speech model 1422 and a TTS front end 1416. The TTS front end 1416 may be the same as front ends used in traditional unit selection or parametric systems. In other embodiments, some or all of the components of the TTS front end 1416 are based on other trained models. The present disclosure is not, however, limited to any particular type of TTS front end 1416. The speech model 1422 may be used to synthesize speech without requiring the TTS unit storage 1472 or the TTS parametric storage 1480, as described in greater detail below.

TTS component receives text data 1410. Although the text data 1410 in FIG. 14 is input into the TTS component 280, it may be output by other component(s) (such as a skill 290, NLU component 260, NLG component 279 or other component) and may be intended for output by the system. Thus in certain instances text data 1410 may be referred to as "output text data." Further, the data 1410 may not necessarily be text, but may include other data (such as symbols, code, other data, etc.) that may reference text (such as an indicator of a word) that is to be synthesized. Thus data 1410 may come in a variety of forms. The TTS front end 1416 transforms the data 1410 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1418. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1410, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1416 may also process other input data 1415, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1410 and/or the text for a TTS request may be accompanied by separate metadata indicating what text should be whispered (or have some other indicated audio characteristic). The speech synthesis engine 1418 may compare the annotated phonetic units models and information stored in the TTS unit storage 1472 and/or TTS parametric storage 1480 for converting the input text into speech. The TTS front end 1416 and speech synthesis engine 1418 may include their own controller(s)/processor(s) and memory or they may use the controller/processor and memory of the server 120, device 110, or other device, for example. Similarly, the instructions for operating the TTS front end 1416 and speech synthesis engine 1418 may be located within the TTS component 280, within the memory and/or storage of the server 120, device 110, or within an external device.

Text data 1410 input into the TTS component 280 may be sent to the TTS front end 1416 for processing. The TTS front end 1416 may include components for performing text normalization, linguistic analysis, linguistic prosody generation, or other such components. During text normalization, the TTS front end 1416 may first process the text input and generate standard text, converting such things as numbers, abbreviations (such as Apt., St., etc.), symbols ($, %, etc.) into the equivalent of written out words.

During linguistic analysis, the TTS front end 1416 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 1472. The linguistic analysis performed by the TTS front end 1416 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 1416 may then perform linguistic prosody generation where the phonetic units are annotated with desired prosodic characteristics, also called acoustic features, which indicate how the desired phonetic units are to be pronounced in the eventual output speech. During this stage the TTS front end 1416 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1416, which may be referred to as a symbolic linguistic representation, may include a sequence of phonetic units annotated with prosodic characteristics. This symbolic linguistic representation may be sent to the speech synthesis engine 1418, which may also be known as a synthesizer, for conversion into an audio waveform of speech for output to an audio output device and eventually to a user. The speech synthesis engine 1418 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1418 may perform speech synthesis using one or more different methods. In one method of synthesis called unit selection, described further below, a unit selection engine 1430 matches the symbolic linguistic representation created by the TTS front end 1416 against a database of recorded speech, such as a database (e.g., TTS unit storage 1472) storing information regarding one or more voice corpuses (e.g., voice inventories 1478a-n). Each voice inventory may correspond to various segments of audio that was recorded by a speaking human, such as a voice actor, where the segments are stored in an individual inventory 1478 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1430 may then use the information about each unit to select units to be joined together to form the speech output.

The unit selection engine 1430 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1420) to form output audio data 1490 representing synthesized speech. Using all the information in the unit database, a unit selection engine 1430 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1432, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1420) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS unit storage 1472 based on feedback of the results of TTS processing, thus enabling the TTS component 280 to improve speech synthesis.

The TTS unit storage 1472 may be customized for an individual user based on his/her individualized desired speech output. In particular, the speech unit stored in a unit database may be taken from input audio data of the user speaking. For example, to create the customized speech output of the system, the system may be configured with multiple voice inventories 1478a-1478n, where each unit database is configured with a different "voice" to match desired speech qualities. Such voice inventories may also be linked to user accounts. The voice selected by the TTS component 280 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1478 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1468) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1430 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1430. As part of unit selection, the unit selection engine 1430 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1472 or in another storage component. For example, different unit selection databases may be stored in TTS unit storage 1472. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1418 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 1432 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1416.

The parametric synthesis engine 1432 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1418, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1432 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1432 may lead to a number of potential audio output sequences. Based on the acoustic model and other potential models, the potential audio output sequences may be scored according to a confidence level of the parametric synthesis engine 1432. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1468, which may represent acoustic settings matching a particular parametric "voice", may be used by the synthesis component 1420 to ultimately create the output audio data 1490.

When performing unit selection, after a unit is selected by the unit selection engine 1430, the audio data corresponding to the unit may be passed to the synthesis component 1420. The synthesis component 1420 may then process the audio data of the unit to create modified audio data where the modified audio data reflects a desired audio quality. The synthesis component 1420 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 1420 may process the audio data for that unit to create a modified unit audio data. The modified unit audio data may then be concatenated to form the output audio data 1490. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 1485 may be output along with the output audio data 1490 so that an ultimate playback device (e.g., device 110) receives instructions for playback that can assist in creating the desired output audio. Thus, the other output data 1485 may include instructions or other data indicating playback device settings (such as volume, playback rate, etc.) or other data indicating how output audio data including synthesized speech should be output. For example, for whispered speech, the output audio data 1490 may include other output data 1485 that may include a prosody tag or other indicator that instructs the device 110 to slow down the playback of the output audio data 1490, thus making the ultimate audio sound more like whispered speech, which is typically slower than normal speech. In another example, the other output data 1485 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 15:
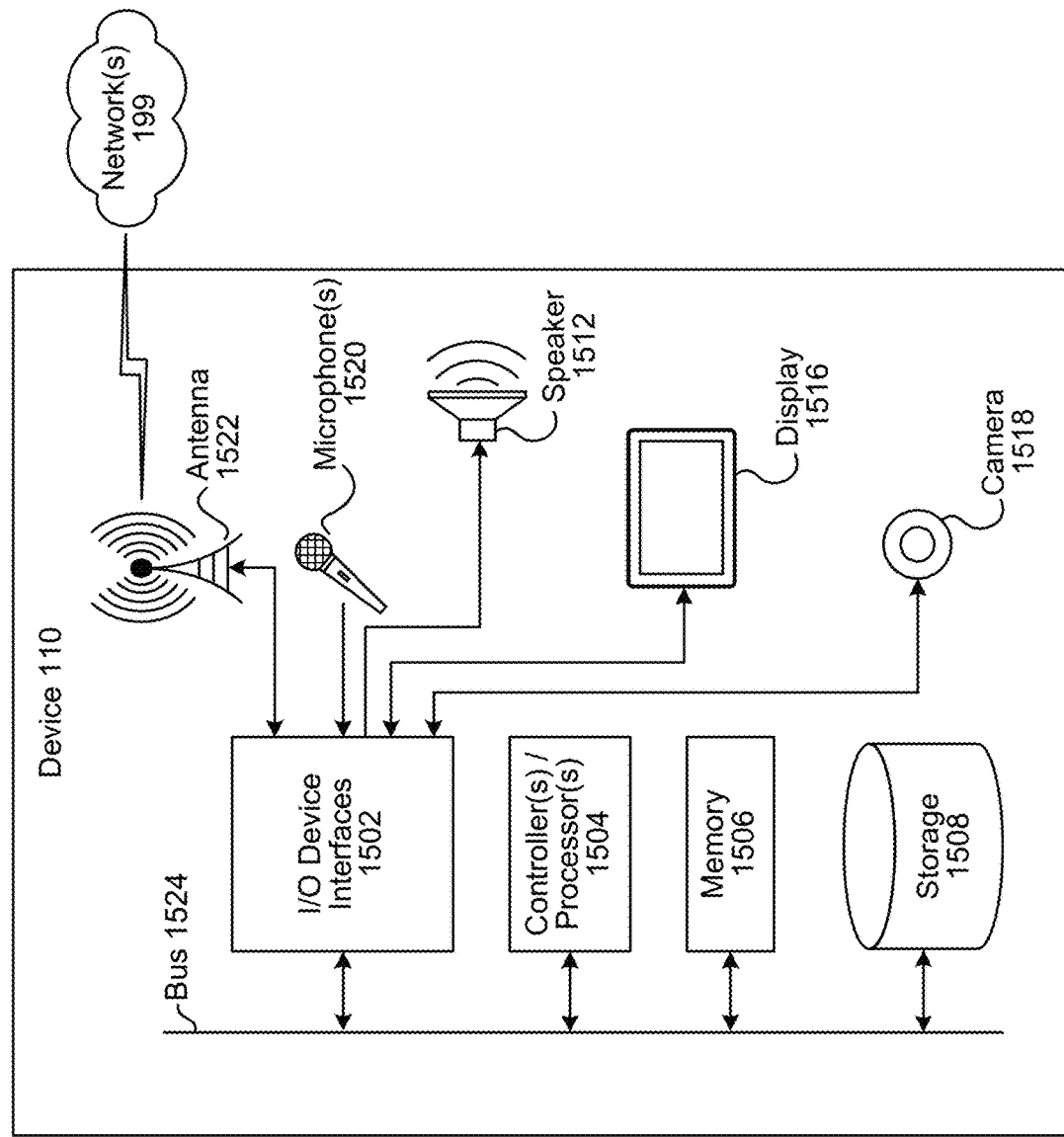
FIG. 15 is a block diagram conceptually illustrating example components of a device, according to embodiments of the present disclosure.
Figure 16:
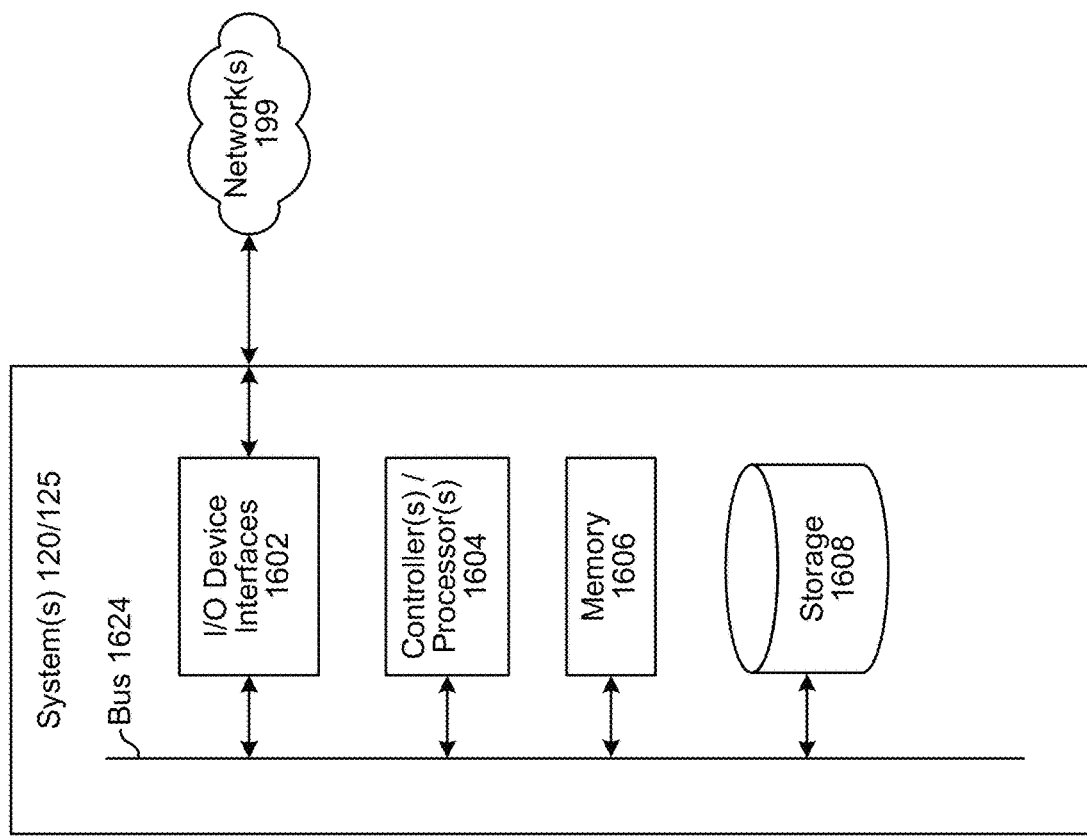
FIG. 16 is a block diagram conceptually illustrating example components of a system, according to embodiments of the present disclosure.

FIG. 15 is a block diagram conceptually illustrating a device 110 that may be used with the system. FIG. 16 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/125) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1502/1602).

Computer instructions for operating each device (110/120/125) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/125) includes input/output device interfaces (1502/1602). A variety of components may be connected through the input/output device interfaces (1502/1602), as will be discussed further below. Additionally, each device (110/120/125) may include an address/data bus (1524/1624) for conveying data among components of the respective device. Each component within a device (110/120/125) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio.

The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1522, the input/output device interfaces 1502 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1502/1602), processor(s) (1504/1604), memory (1506/1606), and/or storage (1508/1608) of the device(s) 110, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

Figure 17:
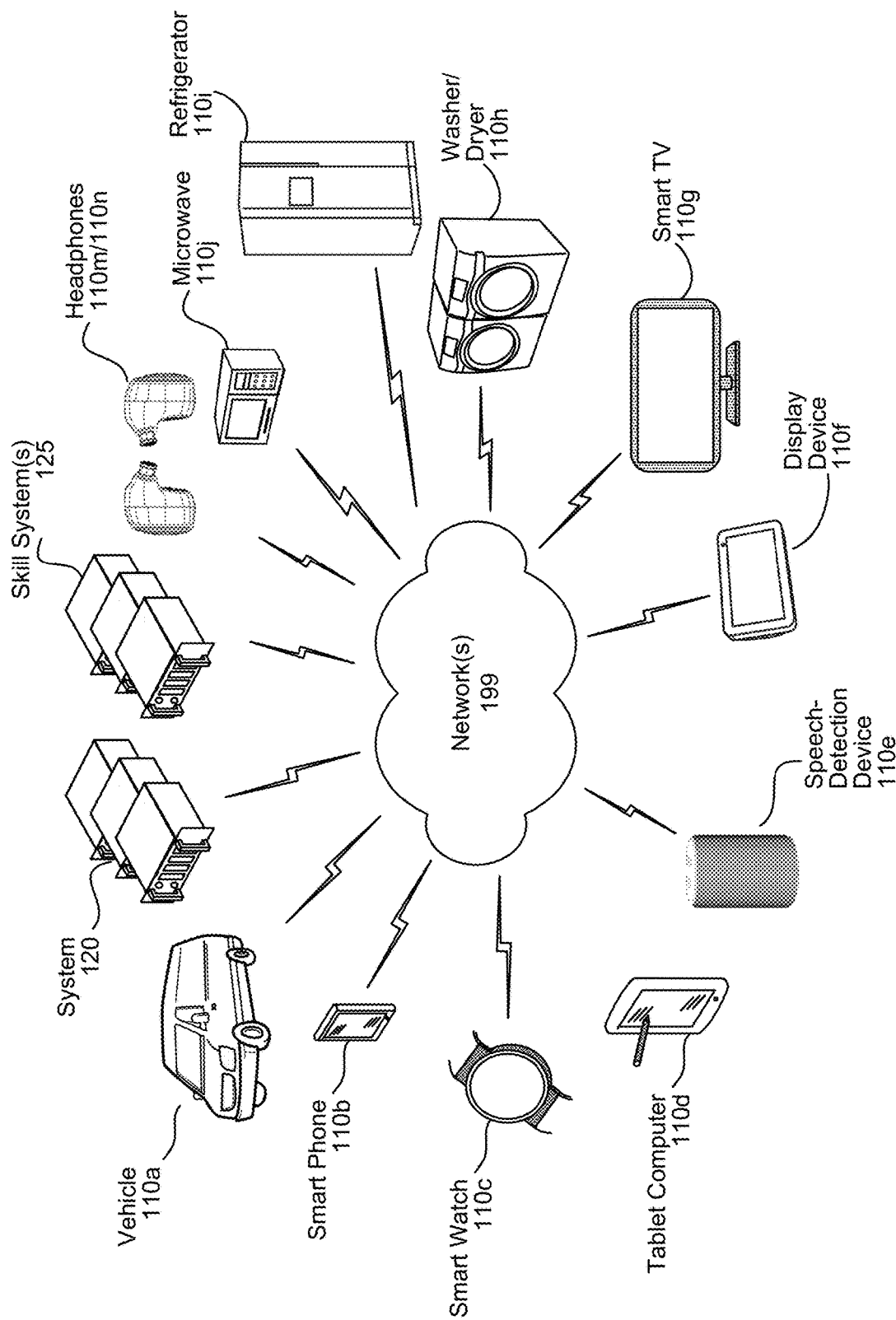
FIG. 17 illustrates an example of a computer network for use with the overall system, according to embodiments of the present disclosure.

As illustrated in FIG. 17, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a speech-detection device 110e, a display device 110f, a smart television 110g, a washer/dryer 110h, a refrigerator 110i, and/or a microwave 110j may be connected to the network(s) 199 through a wireless service provider, over a Wi-Fi 33 or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   receiving, from a first voice-controlled device, first input audio data representing a command and a first indication of a first assistant;
   determining, in response to receiving the first indication, that a first command processing subsystem (CPS) corresponds to a requested assistant for handling the command;
   performing speech processing on the first input audio data to determine first natural language understanding (NLU) result data including a first skill and a first intent;
   determining a second CPS associated with the first skill;
   sending, to a first component configured to generate data representing operations for responding to the command, a first identifier of the first CPS, first data representing the first NLU result data, and a second identifier of the second CPS;
   determining, by the first component, that the second identifier is different from the first identifier;
   in response to determining that the second identifier is different than the first identifier, generating first plan data representing:
      a first operation to be executed by the first component based on a first setting corresponding to the first CPS, and
      a second operation to be executed by a skill system associated with the first skill and based on a second setting corresponding to the second CPS;
   causing the first component to execute the first operation to generate first synthesized speech for output by the first voice-controlled device using a first speech style associated with the first CPS; and
   after causing the first component to execute the first operation, causing the skill system to execute the second operation to generate second synthesized speech for output by the first voice-controlled device using a second speech style associated with the second CPS.

2. The method of claim 1, further comprising:
   in response to receiving the first indication, causing the first voice-controlled device to present a first visual theme indicating that the first CPS corresponds to the requested assistant;
   generating the first plan data to further represent a third operation to be executed by the first voice-controlled device following execution of the first operation, the third operation including causing the first voice-controlled device to present a second visual theme indicating that the second CPS is handling the command;
   causing the first voice-controlled device to output the first synthesized speech;
   receiving first response data from the skill system in response to causing the skill system to execute the second operation;
   after causing the first voice-controlled device to output the first synthesized speech, causing the first voice-controlled device to execute the third operation; and
   after causing the first voice-controlled device to execute the third operation, causing the first voice-controlled device to output the second synthesized speech.

3. The method of claim 1, further comprising:
   determining, by the first component based on first slot data of the NLU result data and the first intent, a first template for generating the first plan data, wherein the first template specifies:
      a verbal message corresponding to the requested CPS, and
      a call to a skill based on a selected CPS; and
   generating the first plan data based on the first template.

4. The method of claim 1, further comprising:
   receiving, from the first voice-controlled device, second input audio data representing a second command and a second indication of a default assistant;
   determining, by the first component based on the second indication, a first template for generating second plan data, wherein the first template specifies:
      a first data field associated with a message corresponding to a selected CPS, and
      a second data field associated with a call to a skill based on the selected CPS; and
   generating the first plan data based on the first template.

5. A method comprising:
   receiving, from a first device, first input data representing a command and a first indication of a first command processing subsystem (CPS);
   performing natural language understanding (NLU) processing based on the first input data to determine first NLU result data including a first skill and a first intent;
   determining a second CPS associated with the first skill;
   sending, to a first component, a first identifier of the first CPS, first data representing the NLU result data, and a second identifier of the second CPS;
   determining, by the first component, that the second identifier is different than the first identifier;
   in response to determining that the second identifier is different from the first identifier:
      generating first data to be executed by the first component based on a first setting corresponding to the first CPS, and
      generating second data to be executed by a skill system associated with the first skill;
   causing the first component to execute a first operation using the first data to generate a first output corresponding to first synthesized speech in a first speech style corresponding to the first CPS;
   after causing the first component to execute the first operation, causing the skill system to execute a second operation to generate first response data; and
   generating, using the first response data, a second output corresponding to second synthesized speech in a second speech style corresponding to the second CPS.

6. The method of claim 5, further comprising:
   in response to receiving the first indication, causing the first device to present a first visual theme indicating that the first CPS is a requested CPS for handling the command; and
   after causing the first component to execute the first operation, causing the first device to present a second visual theme indicating that the second CPS is executing with respect to the command.

7. The method of claim 6, further comprising:
   generating, by the first component, third data to be executed after the first data based on a second setting corresponding to the second CPS;

causing the first component to execute a third operation indicated by the third data to cause the first device to present the second visual theme based on the second setting; and causing the skill system to execute the second operation after causing the first component to execute the third operation.

8. The method of claim 5, further comprising:

causing the first device to output the first synthesized speech; and after causing the first device to output the first synthesized speech, causing the first device to output the second synthesized speech.

9. The method of claim 5, further comprising:

determining, by the first component based on first slot data of the NLU result data and the first intent, a first template for generating first plan data, wherein the first template specifies:
   a first data field associated with a message corresponding to a requested CPS, and
   a second data field associated with a call to a skill based on a selected CPS; and generating the first plan data based on the first template.

10. The method of claim 5, further comprising:

receiving, from the first device, second input data representing a second command and a second indication of a default assistant;

determining, by the first component based on the second indication, a first template for generating second plan data, wherein the first template specifies:
   a first data field associated with a message corresponding to a selected CPS, and
   a second data field associated with a call to a skill based on the selected CPS; and generating second plan data based on the first template.

11. The method of claim 5, further comprising:

prior to receiving the first input data, receiving a first request to enable the first CPS for handling spoken commands received by the first device; and receiving a second request to associate a first wakeword with the first CPS, wherein the first indication represents the first device detecting the first wakeword.

12. The method of claim 5, wherein:

prior to receiving the first input data, receiving a first request to enable the first CPS for handling spoken commands received by the first device; and receiving a second request to associate a first gesture with the first CPS, wherein:
   the first gesture is a non-verbal movement detectable by the first device, and
   the first indication represents the first device detecting the first gesture.

13. A system, comprising:

at least one processor; and at least one memory comprising instructions that, when executed by the at least one processor, cause the system to:
   receive, from a first device, first input data representing a command and a first indication of a first command processing subsystem (CPS);
   perform natural language understanding (NLU) processing based on the first input data to determine first NLU result data including a first skill and a first intent;
   determine a second CPS associated with the first skill;
   send, to a first component of the system, a first identifier of the first CPS, first data representing the NLU result data, and a second identifier of the second CPS;
   determine, by the first component, that the second identifier is different than the first identifier;
   in response to determining that the second identifier is different from the first identifier:
      generate first data to be executed by the first component based on a first setting corresponding to the first CPS, and
      generate second data to be executed by a skill system associated with the first skill;
   cause the first component to execute a first operation using the first data to generate a first output corresponding to first synthesized speech in a first speech style corresponding to the first CPS;
   after causing the first component to execute the first operation, cause the skill system to execute a second operation to generate first response data; and
   generate, using the first response data, a second output corresponding to second synthesized speech in a second speech style corresponding to the second CPS.

14. The system of claim 13, wherein the at least one memory further comprises instructions that, when executed by the at least one processor, further cause the system to:

in response to receiving the first indication, cause the first device to present a first visual theme indicating that the first CPS is a requested CPS for handling the command; and after causing the first component to execute the first operation, cause the first device to present a second visual theme indicating that the second CPS is executing with respect to the command.

15. The system of claim 14, wherein the at least one memory further comprises instructions that, when executed by the at least one processor, further cause the system to:

generate, by the first component, third data to be executed after the first data based on a second setting corresponding to the second CPS;

cause the first component to execute a third operation indicated by the third data to cause the first device to present the second visual theme based on the second setting; and cause the skill system to execute the second operation after causing the first component to execute the third operation.

16. The system of claim 13, wherein the at least one memory further comprises instructions that, when executed by the at least one processor, further cause the system to:

cause the first device to output the first data; and after causing the first device to output the first data, cause the first device to output the second data.

17. The system of claim 13, wherein the at least one memory further comprises instructions that, when executed by the at least one processor, further cause the system to:

determine, by the first component based on first slot data of the NLU result data and the first intent, a first template for generating first plan data, wherein the first template specifies:
   a first data field associated with a message corresponding to a requested CPS, and
   a second data field associated with a call to a skill based on a selected CPS; and generate the first plan data based on the first template.

18. The system of claim 13, wherein the at least one memory further comprises instructions that, when executed by the at least one processor, further cause the system to:
- receive, from the first device, second input data representing a second command and a second indication of a default assistant;
- determine, by the first component based on the second indication, a first template for generating second plan data, wherein the first template specifies:
  - a first data field associated with a message corresponding to a selected CPS, and
  - a second data field associated with a call to a skill based on the selected CPS; and
- generate second plan data based on the first template.

19. The system of claim 13, wherein the at least one memory further comprises instructions that, when executed by the at least one processor, further cause the system to:
- prior to receiving the first input data, receive a first request to enable the first CPS for handling spoken commands received by the first device; and
- receive a second request to associate a first wakeword with the first CPS, wherein the first indication represents the first device detecting the first wakeword.

20. The system of claim 13, wherein the at least one memory further comprises instructions that, when executed by the at least one processor, further cause the system to:
- prior to receiving the first input data, receive a first request to enable the first CPS for handling spoken commands received by the first device; and
- receive a second request to associate a first gesture with the first CPS, wherein:
  - the first gesture is a non-verbal movement detectable by the first device, and
  - the first indication represents the first device detecting the first gesture.

* * * * *